(12) United States Patent
Zhang et al.

(10) Patent No.: US 12,147,642 B2
(45) Date of Patent: Nov. 19, 2024

(54) ALWAYS ON DISPLAY METHOD AND ELECTRONIC DEVICE

(71) Applicant: Honor Device Co., Ltd., Shenzhen (CN)

(72) Inventors: Xiaohang Zhang, Shenzhen (CN); Liwei Huang, Shenzhen (CN); Shishu Yang, Shenzhen (CN); Jie Ren, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 10 days.

(21) Appl. No.: 18/027,527

(22) PCT Filed: Mar. 3, 2022

(86) PCT No.: PCT/CN2022/079146
§ 371 (c)(1),
(2) Date: Mar. 21, 2023

(87) PCT Pub. No.: WO2022/199352
PCT Pub. Date: Sep. 29, 2022

(65) Prior Publication Data
US 2023/0350535 A1      Nov. 2, 2023

(30) Foreign Application Priority Data

Mar. 26, 2021   (CN) .......................... 202110326182.1

(51) Int. Cl.
*G06F 1/32*       (2019.01)
*G06F 1/3206*     (2019.01)
(Continued)

(52) U.S. Cl.
CPC ........ *G06F 3/04815* (2013.01); *G06F 1/3206* (2013.01); *G06F 1/3265* (2013.01); *G06F 3/0488* (2013.01)

(58) Field of Classification Search
CPC ........ G09G 3/293; G09G 3/20; G06F 1/3206; G06F 1/3265; G06F 3/041; G06F 3/0488; G06V 30/32
See application file for complete search history.

(56) References Cited

U.S. PATENT DOCUMENTS 9,153,166 B2    10/2015  Lombardi et al.
10,067,645 B2    9/2018  King et al.
(Continued)

FOREIGN PATENT DOCUMENTS

CN    105723310 A    6/2016
CN    106489112 A    3/2017
(Continued)

*Primary Examiner* — Michael A Faragalla
(74) *Attorney, Agent, or Firm* — Leydig, Voit & Mayer, Ltd.

(57) ABSTRACT

An always on display method and an electronic device relate to the field of terminal technologies. The electronic device receives a screen-off event. In response to the screen-off event, the electronic device may enter the screen-off state. In the screen-off state, the electronic device may display a first screen-off animation in a first screen-off animation group based on a charging status and power information of the electronic device; and after the first screen-off animation ends, if the electronic device detects a first touch operation input by the user, the electronic device may display a second screen-off animation in the first screen-off animation group in response to the first touch operation.

19 Claims, 17 Drawing Sheets

(51) Int. Cl.
    *G06F 1/3234*     (2019.01)
    *G06F 3/04815*   (2022.01)
    *G06F 3/0488*     (2022.01)

(56) References Cited

U.S. PATENT DOCUMENTS

| | | |
|---|---|---|
| 10,721,348 B2 | 7/2020 | Choi et al. |
| 2011/0285727 A1 | 11/2011 | Fernandez et al. |
| 2015/0042572 A1 | 2/2015 | Lombardi et al. |
| 2021/0083498 A1* | 3/2021 | Cho .................. G06T 11/001 |
| 2022/0320913 A1 | 10/2022 | Xu |
| 2023/0326393 A1* | 10/2023 | Huang ............... G06F 1/3265 |
| | | 345/55 |

FOREIGN PATENT DOCUMENTS

| | | |
|---|---|---|
| CN | 109361593 A | 2/2019 |
| CN | 110099176 A | 8/2019 |
| CN | 110221898 A | 9/2019 |
| CN | 110266874 A | 9/2019 |
| CN | 110989882 A | 4/2020 |
| CN | 110994731 A | 4/2020 |
| CN | 111431247 A | 7/2020 |
| CN | 112363785 A | 2/2021 |

* cited by examiner

ALWAYS ON DISPLAY METHOD AND ELECTRONIC DEVICE

CROSS-REFERENCE TO RELATED APPLICATIONS

This application is a national stage of International Application No. PCT/CN2022/079146, filed on Mar. 3, 2022, which claims priority to Chinese Patent Application No. 202110326182.1, filed on Mar. 26, 2021. The disclosures of both of the aforementioned applications are hereby incorporated by reference in their entireties.

TECHNICAL FIELD

This application relates to the field of electronic device technologies, and in particular, to an always on display method and an electronic device.

BACKGROUND

An always on display (AOD) is a function in which an electronic device displays time, incoming call information, push messages, and/or other information in a limited part of a screen without keeping the full screen on.

For example, the electronic device is a mobile phone. With the always on display function enabled, the mobile phone can display time, date, and other information in an area 101 of the screen after the screen is off, as shown in FIG. 1. In this way, a user is still able to obtain information such as time and date when the mobile phone is screen-off.

In some scenarios, after the screen is off, the mobile phone can still display a preset screen-off animation in an area 102 of the screen, as shown in FIG. 1. For example, the screen animation may be a video with duration of 3 s. After displaying of the screen-off animation is completed, the mobile phone may freeze the last frame of image of the screen-off animation. Such always on display method, although improving user's visual experience to some extent, features a monotonous display mode, which makes always on display content not real-time and not interesting.

SUMMARY

This application provides an always on display method and an electronic device, to perform always on display based on a usage status of the electronic device, so that the usage status of the electronic device is more vividly and effectively conveyed to a user in a screen-off state, to make always on display content more real-time and interesting.

To achieve the foregoing objective, the following technical solutions are used in this application.

According to a first aspect, this application provides an always on display method. The method includes: an electronic device receives a screen-off event; in response to the screen-off event, the electronic device enters a screen-off state; the electronic device displays a first screen-off animation in a first screen-off animation group based on a charging status and power information of the electronic device, the first screen-off animation group may include a plurality of screen-off animations, where all the screen-off animations may belong to a same object; and after the first screen-off animation ends, if the electronic device detects a first touch operation input by a user, in response to the first touch operation, the electronic device may display a second screen-off animation in the first screen-off animation group.

In this way, the electronic device can fully and vividly transmit a latest charging status and power information to the user by using the plurality of screen-off animations in the screen-off animation group. This not only makes interaction between the mobile phone and the user more interesting, but also visually and vividly displays a latest battery state of the electronic device to the user, thereby improving user experience.

In a possible implementation, after the first screen-off animation ends, the method further includes: The electronic device may freeze and display a last frame of image of the first screen-off animation. Similarly, after the displaying, by the electronic device, a second screen-off animation in the first screen-off animation group, the method further includes: The electronic device freezes and displays a last frame of image of the second screen-off animation.

In a possible implementation, after the freezing and displaying, by the electronic device, a last frame of image of the second screen-off animation, the method further includes: The electronic device detects a second touch operation input by the user; in response to the second touch operation, the electronic device may obtain the latest charging status and power information of the electronic device; and when the charging status of the electronic device changes or a power level of the electronic device changes, the electronic device plays a third screen-off animation in a corresponding second screen-off animation group; or when the charging status of the electronic device does not change and a power level of the electronic device does not change, the electronic device may replay the first screen-off animation. In this way, after all the screen-off animations in the first screen-off animation group are played, the electronic device may perform always on display in combination with the latest battery state in response to the touch operation input by the user.

In a possible implementation, the detecting, by the electronic device, a first touch operation input by a user includes: The electronic device detects the first touch operation input by the user within preset duration (for example, 10 s) after the first screen-off animation ends. Otherwise, the electronic device may enter a screen sleep state, to reduce power consumption of the electronic device.

In a possible implementation, after the displaying, by the electronic device, a second screen-off animation in the first screen-off animation group, the method further includes: If detecting a third touch operation input by the user within the preset duration after the second screen-off animation ends, the electronic device may obtain the charging status and power information of the electronic device; and when the charging status of the electronic device changes or a power level of the electronic device changes, the electronic device may play a third screen-off animation in a corresponding second screen-off animation group; or when the charging status of the electronic device does not change and a power level of the electronic device does not change, the electronic device may replay the first screen-off animation.

Correspondingly, if the third touch operation input by the user is not detected within the preset duration, the electronic device enters the screen sleep state, to reduce power consumption of the electronic device.

In a possible implementation, after the entering, by the electronic device, a screen sleep state, the method further includes: If detecting a fourth touch operation input by the user within the preset duration, the electronic device may obtain the charging status and power information of the electronic device; and when the charging status of the electronic device changes or the power level of the electronic device changes, the electronic device may play the third screen-off animation in the corresponding second screen-off animation group; or when the charging status of the electronic device does not change and the power level of the electronic device does not change, the electronic device may replay the first screen-off animation. That is, after entering the screen sleep state, the electronic device may perform, in response to the touch operation input by the user, always on display in combination with the latest battery state.

In a possible implementation, after the entering, by the electronic device, a screen-off state, before the displaying, by the electronic device, a first screen-off animation in a first screen-off animation group based on a charging status and power information of the electronic device, the method further includes: The electronic device displays a preset entry screen-off animation, where a last frame of image of the entry screen-off animation is the same as a first frame of image of the first screen-off animation.

In a possible implementation, the last frame of image of the first screen-off animation is the same as a first frame of image of the second screen-off animation; or an animation object in the first screen-off animation is the same as an animation object in the second screen-off animation; or an event performed by an animation object in the first screen-off animation is the same as an event performed by an animation object in the second screen-off animation. This ensures smooth transition to the second screen-off animation after playing of the first screen-off animation is completed, so as to improve viewing experience of the user.

In a possible implementation, after the displaying, by the electronic device, a first screen-off animation in a first screen-off animation group, the method further includes: When the electronic device captures a facial image or an eye image of the user, the electronic device may play a first interactive screen-off animation, where a first frame of image of the first interactive screen-off animation is the same as the last frame of the first screen-off animation. Similarly, after the displaying, by the electronic device, a second screen-off animation in the first screen-off animation group, the method further includes: When the electronic device captures the facial image or the eye image of the user, the electronic device may play a second interactive screen-off animation, where a first frame of image of the second interactive screen-off animation is the same as the last frame of image of the second screen-off animation; and animation objects in the first interactive screen-off animation and the second interactive screen-off animation each present a status of interacting with the user.

In a possible implementation, the first screen-off animation group further includes the third screen-off animation; and after the displaying, by the electronic device, a second screen-off animation in the first screen-off animation group, the method further includes: After the second screen-off animation ends, if the electronic device detects a fifth touch operation input by the user, the electronic device may display the third screen-off animation in the first screen-off animation group in response to the fifth touch operation. In this way, by using the plurality of screen-off animations in the screen-off animation group, an entire process in which the animation object performs an event can be presented more fully and vividly.

In a possible implementation, the electronic device may skip responding to the touch operation input by the user when the first screen-off animation or the second screen-off animation is played, to prevent interruption of playing screen-off animation from affecting viewing experience of the user.

According to a second aspect, this application provides an electronic device, including: a touch screen, where the touch screen includes a touch sensor and a display; one or more processors; and a memory, where the memory stores one or more computer programs. The one or more computer programs include(s) instructions, and when the instructions are executed by the electronic device, the electronic device is enabled to perform the following steps: receiving a screen-off event; entering a screen-off state in response to the screen-off event; displaying a first screen-off animation in a first screen-off animation group based on a charging status and power information of the electronic device, where the first screen-off animation group may include a plurality of screen-off animations; and after the first screen-off animation ends, if a first touch operation input by a user is detected, displaying a second screen-off animation in the first screen-off animation group in response to the first touch operation.

In a possible implementation, after the first screen-off animation ends, the electronic device is further configured to freeze and display a last frame of image of the first screen-off animation; and after the electronic device displays the second screen-off animation in the first screen-off animation group, the electronic device is further configured to freeze and display a last frame of image of the second screen-off animation.

In a possible implementation, after the electronic device freezes and displays the last frame of image of the second screen-off animation, the electronic device is further configured to: detect a second touch operation input by the user; in response to the second touch operation, obtain the charging status and power information of the electronic device; and when the charging status of the electronic device changes or a power level of the electronic device changes, play a third screen-off animation in a corresponding second screen-off animation group; or when the charging status of the electronic device does not change and a power level of the electronic device does not change, replay the first screen-off animation.

In a possible implementation, that the electronic device detects the first touch operation input by the user includes: The electronic device detects the first touch operation input by the user within preset duration after the first screen-off animation ends.

In a possible implementation, after the electronic device displays the second screen-off animation in the first screen-off animation group, the electronic device is further configured to: if detecting a third touch operation input by the user within the preset duration after the second screen-off animation ends, obtain the charging status and power information of the electronic device; and when the charging status of the electronic device changes or a power level of the electronic device changes, play a third screen-off animation in a corresponding second screen-off animation group; or when the charging status of the electronic device does not change and a power level of the electronic device does not change, replay the first screen-off animation.

In a possible implementation, if no first touch operation input by the user is detected within the preset duration, the electronic device enters a screen sleep state; or if no third touch operation input by the user is detected within the preset duration, the electronic device enters a screen sleep state.

In a possible implementation, after the electronic device enters the screen sleep state, the electronic device is further configured to: if detecting a fourth touch operation input by the user within the preset duration, obtain the charging status and power information of the electronic device; and when the charging status of the electronic device changes or the power level of the electronic device changes, play the third screen-off animation in the corresponding second screen-off animation group; or when the charging status of the electronic device does not change and the power level of the electronic device does not change, replay the first screen-off animation.

In a possible implementation, after the electronic device enters the screen-off state, before the electronic device displays the first screen-off animation in the first screen-off animation group based on the charging status and power information of the electronic device, the electronic device is further configured to display a preset entry screen-off animation, where a last frame of image of the entry screen-off animation is the same as a first frame of image of the first screen-off animation.

In a possible implementation, the last frame of image of the first screen-off animation is the same as a first frame of image of the second screen-off animation; or an animation object in the first screen-off animation is the same as an animation object in the second screen-off animation; or an event performed by an animation object in the first screen-off animation is the same as an event performed by an animation object in the second screen-off animation.

In a possible implementation, after the electronic device displays the first screen-off animation in the first screen-off animation group, the electronic device is further configured to play a first interactive screen-off animation when the electronic device captures a facial image or an eye image of the user, where a first frame of image of the first interactive screen-off animation is the same as the last frame of the first screen-off animation; and after the electronic device displays the second screen-off animation in the first screen-off animation group, the electronic device is further configured to play a second interactive screen-off animation when the electronic device captures the facial image or the eye image of the user, where a first frame of image of the second interactive screen-off animation is the same as the last frame of image of the second screen-off animation; and animation objects in the first interactive screen-off animation and the second interactive screen-off animation each present a status of interacting with the user.

In a possible implementation, the first screen-off animation group further includes the third screen-off animation; and after the electronic device displays the second screen-off animation in the first screen-off animation group, the electronic device is further configured to: detect a fifth touch operation input by the user after the first screen-off animation ends; and display the third screen-off animation in the first screen-off animation group in response to the fifth touch operation.

In a possible implementation, the electronic device may skip responding to the touch operation input by the user when the first screen-off animation or the second screen-off animation is played.

According to a third aspect, this application provides an electronic device, including: a memory, a display, and one or more processors. The memory, the display, and the processor (s) are coupled to each other. The memory is configured to store computer program code, and the computer program code includes computer instructions. When the electronic device runs, the processor is configured to execute the one or more computer instructions stored in the memory, to enable the electronic device to perform the always on display method in any one of the implementations of the first aspect.

According to a fourth aspect, this application provides a computer storage medium including computer instructions. When the computer instructions are run on an electronic device, the electronic device is enabled to perform the always on display method in any one of the implementations of the first aspect.

According to a fifth aspect, this application provides a computer program product. When the computer program product runs on an electronic device, the electronic device is enabled to perform the always on display method in any one of the implementations of the first aspect.

It may be understood that the electronic device in the second aspect and the third aspect, the computer storage medium in the fourth aspect, and the computer program product in the fifth aspect are all used to perform the corresponding methods provided above. Therefore, for beneficial effects that they can achieve, reference may be made to beneficial effects of the corresponding methods provided above. Details are not described herein again.

DESCRIPTION OF EMBODIMENTS

The following terms "first" and "second" are merely used for description, but should not be understood as indicating or implying relative importance or implying a quantity of indicated technical features. Therefore, a feature limited by "first" or "second" may explicitly or implicitly include one or more features. In descriptions of embodiments, unless otherwise stated, "a plurality of" means two or more.

The following describes implementation of embodiments in detail with reference to accompanying drawings.

For example, an always on display method provided in embodiments of this application can be applied to a mobile phone, an in-vehicle device (also referred to as a vehicle-mounted device), a tablet computer, a notebook computer, an ultra-mobile personal computer (UMPC), a handheld computer, a netbook, a personal digital assistant (PDA), a wearable electronic device, a virtual reality device, or another electronic device with an always on display function, which are not limited in embodiments of this application.

Figure 1:
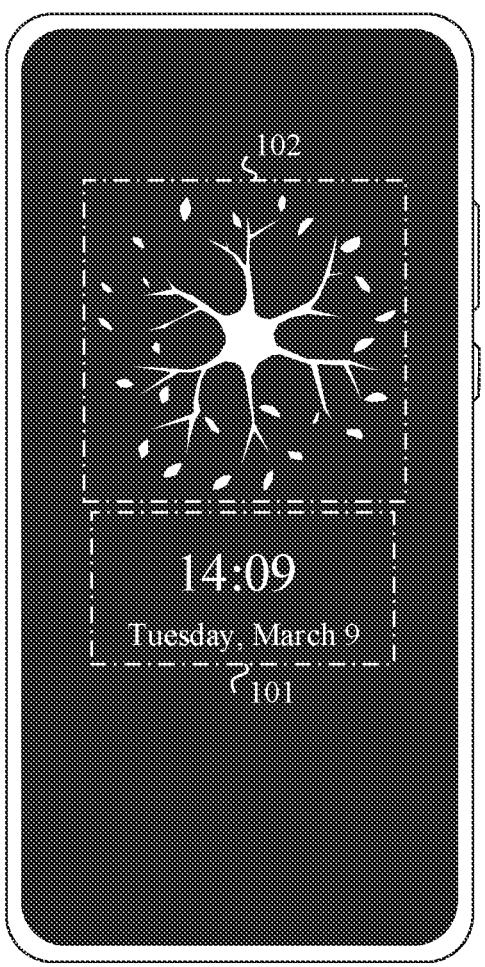
FIG. 1 is a schematic diagram of an application scenario of an always on display function in the conventional technology.
Figure 2:
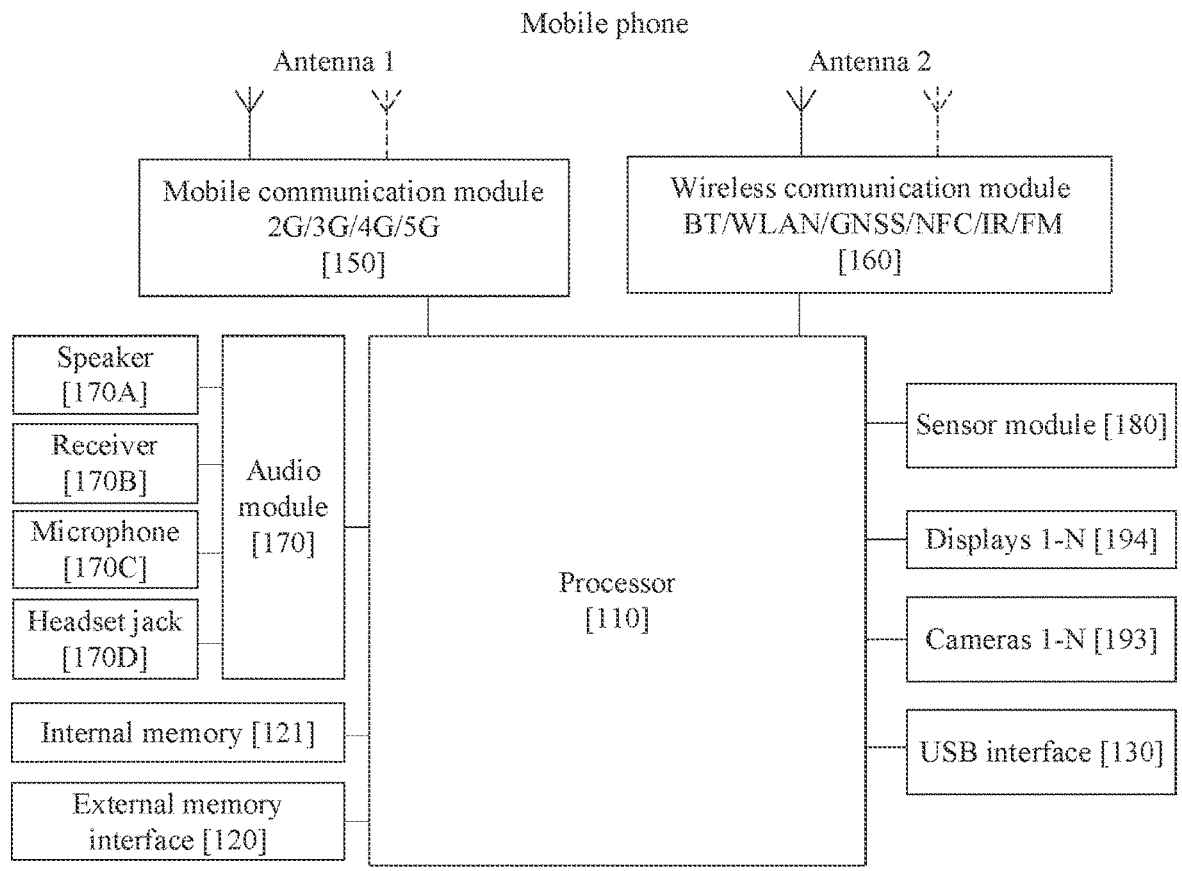
FIG. 2 is schematic diagram 1 of a structure of an electronic device according to an embodiment of this application.

For example, the foregoing electronic device is a mobile phone. FIG. 2 is a schematic diagram of a structure of a mobile phone.

The mobile phone may include a processor 110, an external memory interface 120, an internal memory 121, a universal serial bus (USB) interface 130, an antenna 1, an antenna 2, a mobile communication module 150, a wireless communication module 160, an audio module 170, a speaker 170A, a receiver 170B, a microphone 170C, a headset jack 170D, a sensor module 180, and the like.

It may be understood that the structure illustrated in this embodiment of this application does not constitute a specific limitation on the mobile phone. In some other embodiments of this application, the mobile phone may include more or fewer components than those shown in the figure, or combine some components, or split some components, or have different component arrangements. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate devices or may be integrated into one or more processors.

The processor 110 may be further provided with a memory, configured to store an instruction and data. In some embodiments, the memory in the processor 110 is a cache. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, and the like.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile phone may be configured to cover one or more communication frequency bands. Different antennas may be further multiplexed, to improve antenna utilization. For example, the antenna 1 may be multiplexed into a diversity antenna of a wireless local area network. In some other embodiments, the antenna may be used together with a tuning switch.

The mobile communication module 150 may provide a solution to wireless communication such as 2G/3G/4G/5G applied to the mobile phone. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal that is modulated by the modem processor, and convert the signal into an electromagnetic wave and radiate the electromagnetic wave by using the antenna 1. In some embodiments, at least some of function modules in the mobile communication module 150 may be disposed in the processor 110. In some embodiments, at least some of function modules in the mobile communication module 150 may be disposed in a same device as at least some of modules in the processor 110.

The wireless communication module 160 may provide a solution to wireless communication applied to the mobile phone, for example, a wireless local area network (WLAN) (such as a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components integrating at least one communication processor module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, in the mobile phone, the antenna 1 is coupled to the mobile communication module 150, and the antenna 2 is coupled to the wireless communication module 160, so that the mobile phone can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or satellite based augmentation systems (SBAS).

The mobile phone implements a display function by using the GPU, a display 194, the application processor, and the like. The GPU is an image processing microprocessor, which is connected to the display 194 and the application processor. The GPU is configured to perform mathematical and geometric calculations to render graphics. The processor 110 may include one or more GPUs, and the processor 110 executes program instructions to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like. In some embodiments, the mobile phone may include 1 or N displays 194, where N is a positive integer greater than 1.

Using an OLED display as an example, one OLED display may include a plurality of OLED pixel units arranged in an array. As shown in FIG. 2, each OLED pixel unit includes a cathode, an anode, and an electron transport layer, a hole transport layer and a light-emitting layer that are located between the cathode and the anode. The cathode may be a metal electrode, and the anode may be an indium tin oxide (ITO) transparent electrode.

After a driving voltage V is input to the cathode and the anode, under an action of the driving voltage V, electrons are transferred from the cathode to the electron transport layer, and holes are injected from the anode to the hole transport layer. The electrons and holes meet in the light-emitting layer to produce excitons, which excite light-emitting molecules in the light-emitting layer, to generate a light source after radiation. Different driving voltages V can excite corresponding OLED pixel units to present different colors and luminance. In this way, the OLED pixel units in the OLED display can display pictures corresponding to different driving voltages.

Organic materials in the electron transport layer, the hole transport layer, and the light-emitting layer will gradually age with use. A phenomenon of a ghost image on the OLED display is actually the result of faster depletion of active materials from OLED pixel units at a specific position than other positions because the pixel units at that position are always displaying a same still image over a long time, and such faster depletion causes faster attenuation of emitting efficiency, so as to leave the ghost image on the OLED display.

The mobile phone can implement a photographing function by using the ISP, a camera 193, the video codec, the GPU, the display 194, the application processor, and the like.

The ISP is configured to process data fed back by the camera 193. For example, during photographing, a shutter is pressed, light is transmitted to a photosensitive element of the camera by using a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and a color temperature in a photographing scenario. In some embodiments, the ISP may be provided in the camera 193.

The camera 193 is configured to capture a still image or a video. An optical image of an object is generated through a lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert into a digital image signal. The ISP outputs the digital image signal to the DSP for processing. The DSP converts the digital image signal into an image signal in a standard format such as RGB or YUV. In some embodiments, the mobile phone may include 1 or N cameras 193, and N is a positive integer greater than 1.

The digital signal processor is configured to process a digital signal, and may further process another digital signal in addition to a digital image signal. For example, when the mobile phone selects a frequency, the digital signal processor is configured to perform Fourier transformation and the like on frequency energy.

The video codec is configured to compress or decompress a digital video. The mobile phone may support one or more video codecs. In this way, the mobile phone may play or record videos in a plurality of encoding formats, for example, moving picture experts group (MPEG) 1, MPEG 2, MPEG 3, and MPEG 4.

The external memory interface 120 may be configured to connect to an external storage card such as a Micro SD card, to expand a storage capability of the mobile phone. The external storage card communicates with the processor 110 by using the external memory interface 120, to implement a data storage function, For example, a file such as music or a video is stored in the external storage card.

The internal memory 121 may be configured to store computer executable program code, where the executable program code includes instructions. The processor 110 executes various function applications and data processing of the mobile phone by running instructions stored in the internal memory 121. The internal memory 121 may include a program storage area and a data storage area. The program storage area may store an operating system, an application required by at least one function (such as a sound play function and an image display function), and the like. The data storage area may store data (such as audio data and an address book) created during use of the mobile phone, and the like. In addition, the internal memory 121 may include a high-speed random access memory, and may further include a non-volatile memory such as at least one magnetic disk memory, a flash memory, or a universal flash storage (UFS).

The mobile phone can implement audio functions (such as music playing and sound recording) by using the audio module 170, the speaker 170A, the receiver 170B, the microphone 170C, the headset jack 170D, the application processor, and the like.

The audio module 170 is configured to convert digital audio information into an analog audio signal for outputting, and is further configured to convert an analog audio input into a digital audio signal. The audio module 170 may be further configured to encode and decode audio signals. In some embodiments, the audio module 170 may be disposed in the processor 110 or some of function modules of the audio module 170 may be disposed in the processor 110.

The speaker 170A, also referred to as a "horn", is configured to convert an audio electrical signal into a sound signal. The mobile phone may be used to listen to music or answer a hands-free call by using the speaker 170A.

The receiver 170B, also referred to as an "earpiece", is configured to convert an audio electrical signal into a sound signal. When the mobile phone is used to answer a call or receive voice information, the receiver 170B may be put close to the ear, to receive voice.

The microphone 170C, also referred to as a "mic" or "mike", is configured to convert a sound signal into an electrical signal. When making a call or sending voice information, a user may produce sound with the mouth approaching the microphone 170C, to input a sound signal to the microphone 170C. One or more microphones 170C may be disposed in the mobile phone. In some other embodiments, two microphones 170C may be disposed in the mobile phone, to implement a noise reduction function in addition to collecting a sound signal. In some other embodiments, three, four, or more microphones 170C may alternatively be disposed in the mobile phone, to recognize a sound source, implement a directional recording function, and the like in addition to collecting a sound signal and implementing noise reduction.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the mobile phone may further include a charging management module, a power management module, a power supply, a button, an indicator, one or more SIM card interfaces, and the like. This is not limited in this embodiment of this application.

Figure 3:
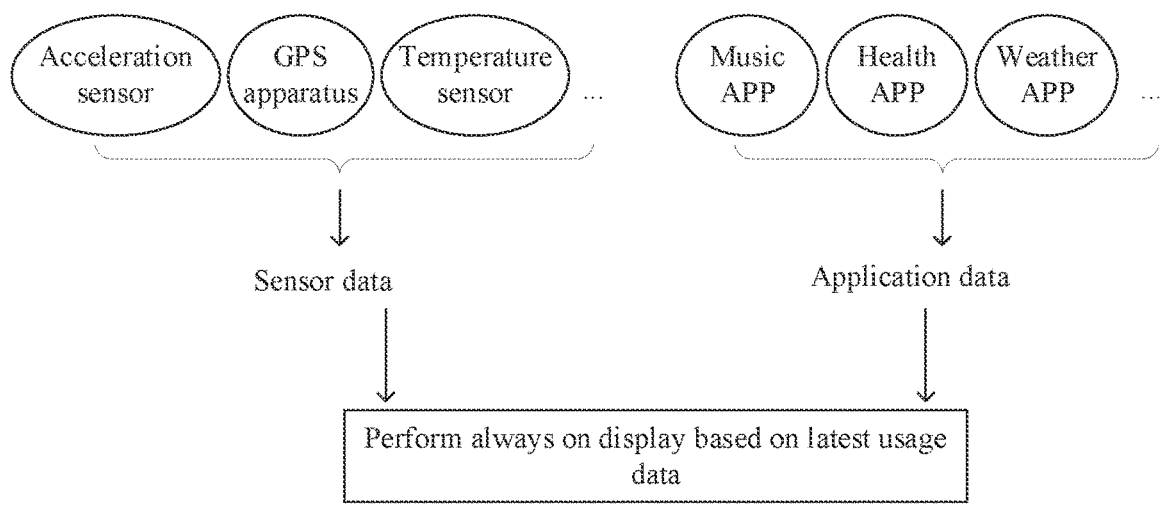
FIG. 3 is schematic flowchart 1 of an always on display method according to an embodiment of this application.

Still in the example in which the foregoing electronic device is a mobile phone, as shown in FIG. 3, the mobile phone may use the sensors in the above sensor module to collect corresponding sensor data. For example, the mobile phone may use a GPS apparatus to obtain a location of the user. For another example, the mobile phone may use the acceleration sensor and a gravity sensor to obtain a user step count. For another example, the mobile phone may use the temperature sensor to obtain a temperature of an environment in which the user is located.

Still as shown in FIG. 3, applications (APPs) such as weather, calendar, music, or health can also be installed on the mobile phone. The mobile phone may also obtain corresponding application data from these applications. For example, the mobile phone can obtain power information of the mobile phone through a battery function in a settings APP. For another example, the mobile phone can learn whether the mobile phone is playing music through the music APP. For another example, the mobile phone can obtain health data such as the step count and heart rate of the user through the health APP.

In embodiments of this application, the foregoing sensor data and/or application data may be referred to as usage data of the mobile phone, and the usage data may be used to reflect a usage status of the mobile phone. Still as shown in FIG. 3, when the mobile phone is screen-off (also referred to as being screen-off, screen-off, screen-locked, or screen-sleep), the mobile phone can perform always on display based on latest usage data, so that always on display content displayed by the mobile phone in a screen-off state is associated with a latest usage status of the mobile phone.

For example, when the latest usage data of the mobile phone indicates that the mobile phone is playing music, the mobile phone can display a screen-off animation 1 of a dancing bear after the screen is off. For another example, when the latest usage data of the mobile phone indicates that the user step count is greater than a preset value, the mobile phone can display a screen-off animation 2 of an exercising bear after the screen is off. For another example, when the latest usage data of the mobile phone indicates that power of the mobile phone is less than a preset value, the mobile phone can display a screen-off animation 3 of a bear lying down after the screen is off. In this way, by displaying a screen-off animation associated with the usage data of the mobile phone, the mobile phone in the screen-off state is still able to convey the latest usage status of the mobile phone to the user. This not only makes interaction between the mobile phone and the user more interesting, but also effectively presents the latest usage status (such as a power level and whether the mobile phone is playing music) of the mobile phone to the user in a visual and vivid way, thereby improving user experience.

Certainly, the mobile phone in the screen-off state may alternatively convey the usage status of the mobile phone to the user in other manners such as displaying text or a picture associated with the usage data of the mobile phone. This is not limited in this embodiment of this application.

The always on display method provided by embodiments of this application is described in detail below with reference to the accompanying drawings. The following embodiments are all described by using an example in which the electronic device with an always on display function is a mobile phone.

Figure 4:
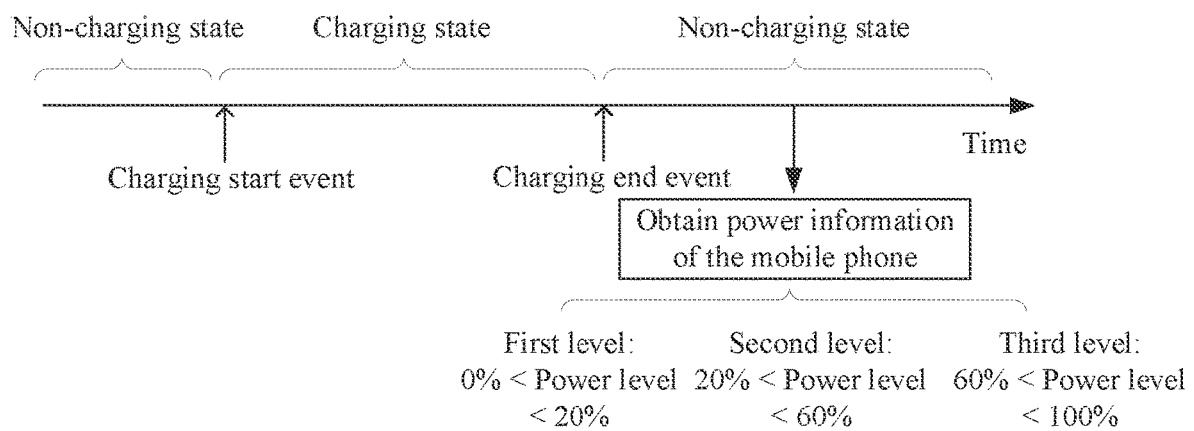
FIG. 4 is schematic flowchart 2 of an always on display method according to an embodiment of this application.

For example, the mobile phone may be provided with a power management unit, and the power management unit is capable of monitoring a charging status of the mobile phone in real time. For example, the power management unit may be a power manager service (PMS) in the mobile phone. When the mobile phone is connected to a USB or wireless charging apparatus, a charging start event may be reported to the PMS. Correspondingly, when the mobile phone is disconnected from the USB or wireless charging apparatus, a charging end event may be reported to the PMS. Then, as shown in FIG. 4, when obtaining the charging start event and no charging end event, the PMS can determine that the mobile phone is in a charging state. Otherwise, the PMS can determine that the mobile phone is in a non-charging state.

In some embodiments, the foregoing power management unit (for example, PMS) may further monitor power information of the mobile phone in real time, and then determine a specific level of power of the mobile phone based on the power information of the mobile phone. For example, three levels may be defined in advance for the power of the mobile phone. The first level is 0%<the power≤20%, which is a low battery state; the second level is 20%<the power≤60%, which is a medium battery state; and the third level is 60%<the power≤100%, which is a high battery state. Certainly, persons skilled in the art may alternatively define more or fewer levels for the power of the mobile phone based on actual needs or actual application scenarios. Still as shown in FIG. 3, after determining that the mobile phone is in the non-charging state, the power management unit may further determine that current power of the mobile phone is in the first level, the second level, or the third level based on newly obtained power information.

In embodiments of this application, when entering the screen-off state, the mobile phone can obtain a latest charging status and power information of the mobile phone according to the foregoing method, and then display different screen-off animations (or screen-off animation groups) in the screen-off state based on the latest charging status and power information of the mobile phone. In this way, a current battery state of the mobile phone can be vividly and visually conveyed to a user through different screen-off animations (or screen-off animation groups), so that the user can visually and vividly learn the battery state of the mobile phone when the mobile phone is screen-off, and the always on display becomes more interesting.

The screen-off animation group refers to a group of screen-off animations. That is, the screen-off animation group may include a plurality of screen-off animations, and each screen-off animation is a video of specific duration. For example, duration of each screen-off animation may be 3 s.

For example, the plurality of screen-off animations in the screen-off animation group may belong to a same subject, for example, three screen-off animations in a screen-off animation group A are animations of a subject of a dancing bear. That is, an animation object (such as a character or an animal) of each screen-off animation in a same screen-off animation group may be the same, and an event performed by the animation object may be the same. By using the plurality of screen-off animations in the screen-off animation group, an entire process in which the animation object performs an event (such as the dancing bear) can be presented more fully and vividly.

For example, the plurality of screen-off animations in the screen-off animation group may be continuous, for example, the screen-off animation group A includes the screen-off animation 1 and the screen-off animation 2, and the last frame of image of the screen-off animation 1 may be the same as or similar to the first frame of image of the screen-off animation 2. For another example, the last frame of image of the screen-off animation 2 may be the same as or similar to the first frame of image of the screen-off animation 1, so that the screen-off animation 1 and the screen-off animation 2 may be seamlessly connected when the screen-off animation group is played circularly, and a phenomenon such as a sudden image change does not occur to affect user experience.

Figure 5:
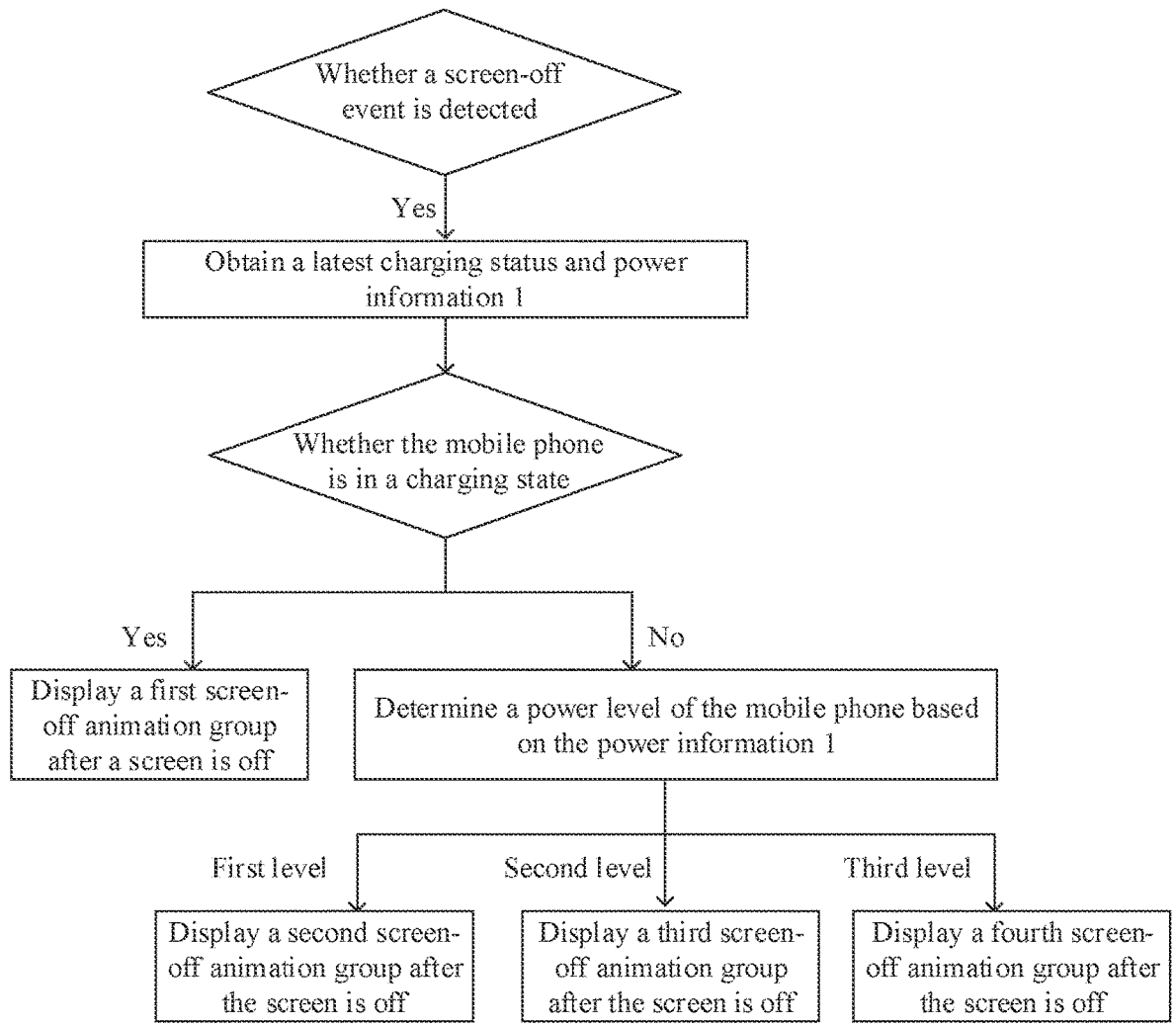
FIG. 5 is schematic flowchart 3 of an always on display method according to an embodiment of this application.

In some embodiments, as shown in FIG. 5, the mobile phone may receive a screen-off event input by the user, and the screen-off event may be used to trigger the mobile phone to enter a screen-off state. For example, the screen-off event may be an event that the user presses a power button when the mobile phone is screen-on. For another example, the screen-off event may be an event that no user operation is detected within a time period when the mobile phone is screen-on.

Still as shown in FIG. 5, if the mobile phone detects the screen-off event, the mobile phone can obtain the latest charging status and power information 1 according to the foregoing method. If the mobile phone is in the charging state, regardless of the battery level of the mobile phone, after the screen is off, the mobile phone may display a first screen-off animation group associated with the charging state. A plurality of screen-off animations in the first screen-off animation group may convey the charging state of the mobile phone to the user.

Figure 6:
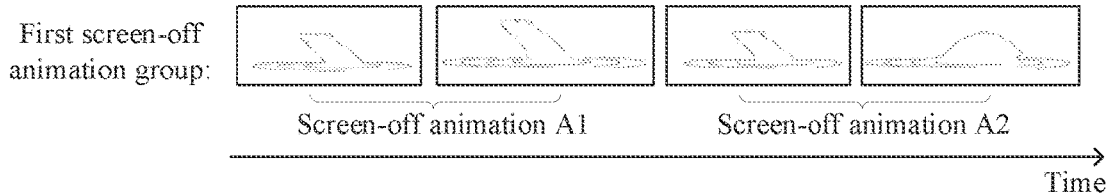
FIG. 6 is schematic diagram 1 of an application scenario of an always on display method according to an embodiment of this application.

For example, as shown in FIG. 6, the first screen-off animation group may be used to display a polar bear swimming in a lake. The first screen-off animation group may include a screen-off animation A1 and a screen-off animation A2. The screen-off animation A1 and the screen-off animation A2 may be two different stages when the polar bear swims in the lake. Certainly, the first screen-off animation may be a process in which a cat sleeps on the grass, or the like. In this way, the charging state of the mobile phone can be conveyed to the user through relatively leisurely animations such as swimming and sleeping, so that the user can visually and vividly learn that the mobile phone is currently in the charging state.

Still as shown in FIG. 5, if the mobile phone is in the non-charging state, the mobile phone may determine a specific level of the power of the mobile phone based on a newly obtained power information 1. For example, if 0%<the power information 1≤20%, the mobile phone may determine that the power of the mobile phone is at the first level, that is, a low battery state, and after the screen is off, the mobile phone can display a second screen-off animation group associated with the first level of power information.

Figure 7:
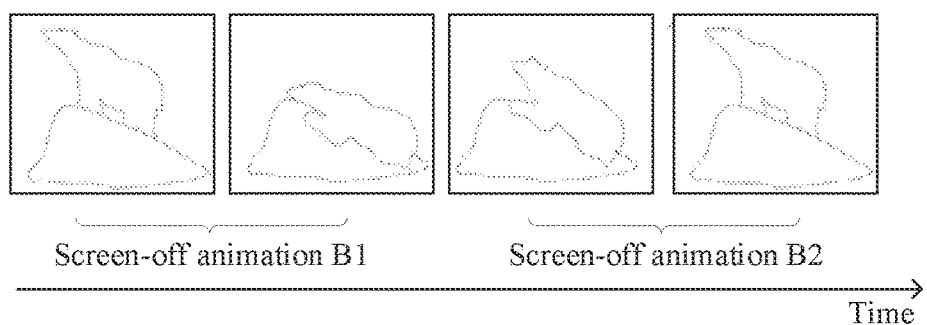
FIG. 7 is schematic diagram 2 of an application scenario of an always on display method according to an embodiment of this application.

For example, as shown in FIG. 7, the second screen-off animation group may be used to display a polar bear lying on the ice and looking up at the sky. The second screen-off animation group may include a screen-off animation B1 and a screen-off animation B2. The screen-off animation B1 and the screen-off animation B2 may be two different stages of the polar bear lying on the ice and looking up the sky. In the second screen-off animation group, a moving speed (for example, V1) of the polar bear may be lower, or a moving range (A1) of the polar bear may be smaller, so that the polar bear looks more tired, to visually and vividly convey information to the user that the phone is in a low battery state.

Still as shown in FIG. 5, if 20%<the power information 1≤60%, the mobile phone may determine that the power of the mobile phone is at the second level, that is, a medium battery state, and after the screen is off, the mobile phone can display a third screen-off animation group associated with power information of the second level.

Figure 8:
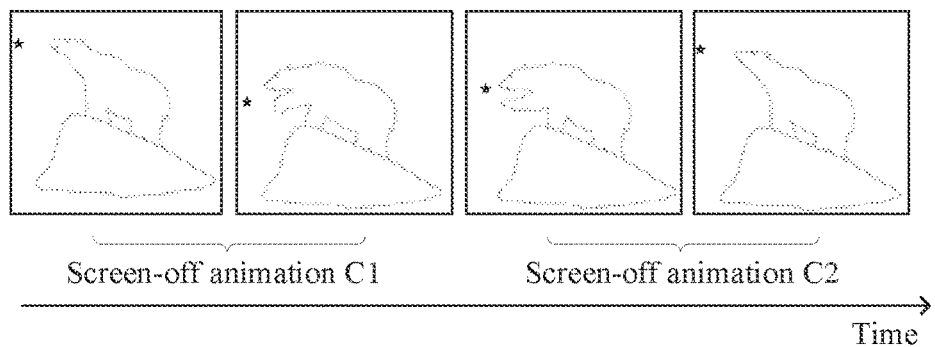
FIG. 8 is schematic diagram 3 of an application scenario of an always on display method according to an embodiment of this application.

Similarly, as shown in FIG. 8, the third screen-off animation may be a process in which a polar bear on the ice interacts with a shooting star or another object. The third screen-off animation group may include a screen-off animation C1 and a screen-off animation C2. The screen-off animation C1 and the screen-off animation C2 may be two different stages of the polar bear on the ice interacting with a shooting star. A moving speed (for example, V2) of the polar bear in the third screen-off animation group may be higher than the moving speed of the polar bear in the second screen-off animation group, that is, V2>V1. Alternatively, a moving range (for example, A2) of the polar bear in the third screen-off animation group may be larger than the moving range of the polar bear in the second screen-off animation group, that is, A2>A1. In this way, compared with the second screen-off animation group, the polar bear in the third screen-off animation group looks more energetic, thereby visually and vividly conveying information to the user that the mobile phone is in a medium battery state.

Still as shown in FIG. 5, if 60%<the power information 1≤100%, the mobile phone may determine that the power of the mobile phone is at the third level, that is, a high battery state, and after the screen is off, the mobile phone can display a fourth screen-off animation group associated with power information of the third level.

Figure 9:
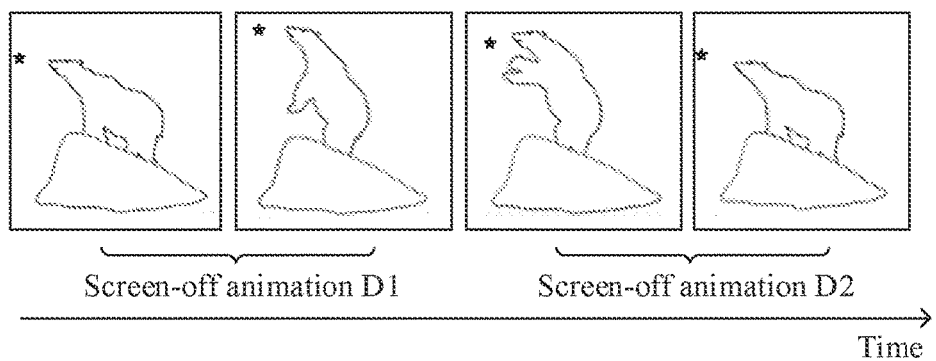
FIG. 9 is schematic diagram 4 of an application scenario of an always on display method according to an embodiment of this application.

Similarly, as shown in FIG. 9, the fourth screen-off animation group may be used to display a polar bear standing on the ice and interacting with a shooting star or another object. The fourth screen-off animation group may include a screen-off animation D1 and a screen-off animation D2. The screen-off animation D1 and the screen-off animation D2 may be two different stages of the polar bear standing on the ice and interacting with a shooting star. A moving speed (for example, V3) of the polar bear in the fourth screen-off animation group may be higher than the moving speed of the polar bear in the third screen-off animation group, that is, V3>V2. Alternatively, a moving range (for example, A3) of the polar bear in the fourth screen-off animation group may be larger than the moving range of the polar bear in the third screen-off animation group, that is, A3>A2. In this way, compared with the third screen-off animation group, the polar bear in the fourth screen-off animation group looks even more energetic, thereby visually and vividly conveying information to the user that the mobile phone is in a high battery state.

It can be learned that when entering the screen-off state, the mobile phone may display, based on the charging status and power information of the mobile phone, a corresponding screen-off animation group after the screen is off, to convey a current battery state of the mobile phone to the user by using a screen-off animation in the corresponding screen-off animation group. In this way, when the mobile phone is in the screen-off state, the user can visually and effectively learn the current battery state of the mobile phone from content of the animation in the screen-off animation group, to make always on display content more real-time and interesting.

It should be noted that the forgoing embodiment is described by using an example in which the screen-off animation group includes two screen-off animations. It may be understood that any screen-off animation group may include two or more screen-off animations. This is not limited in this embodiment of this application.

Figure 10:
FIG. 10 is schematic diagram 5 of an application scenario of an always on display method according to an embodiment of this application.

For example, as shown in FIG. 10, after entering the screen-off state, the mobile phone can display a corresponding screen-off animation in a first area 1001 of the screen. In addition, after entering the screen-off state, the mobile phone may also display the current time or date or an icon of a notification message in a second area 1002. Certainly, the mobile phone can also display a fingerprint recognition area or the like in the screen-off state. This is not limited in this embodiment of this application.

In some embodiments, the user may set a plurality of display modes for the always on display function of the mobile phone, such as all-day display, timed display, or display upon touch. In the all-day display mode, when the mobile phone enters the screen-off state at any time of a day, the foregoing screen-off animation and like content need to be displayed. In the timed display mode, if the mobile phone enters the screen-off state within a time range set by the user, the foregoing screen-off animation and like content need to be displayed. For example, the user sets the always on display function to be enabled in the time range of 8:00-18:00. Then, after the mobile phone detects a screen-off event, if a current time is between 8:00-18:00, the foregoing screen-off animation and like content may be displayed after the screen is off. Otherwise, the mobile phone may enter a screen sleep state. In the display upon touch mode, after the mobile phone enters the screen-off state, the foregoing screen-off animation and like content are displayed in fixed time. If a touch operation of the user is not detected, the mobile phone may stop displaying the foregoing screen-off animation and like content and enter the screen sleep state. Correspondingly, if a touch operation of the user is detected in the screen sleep state, the mobile phone may display the foregoing screen-off animation and like content again. The mobile phone in the screen sleep state generally does not display any content on the display, so that the entire display area of the display appears black.

Figure 11:
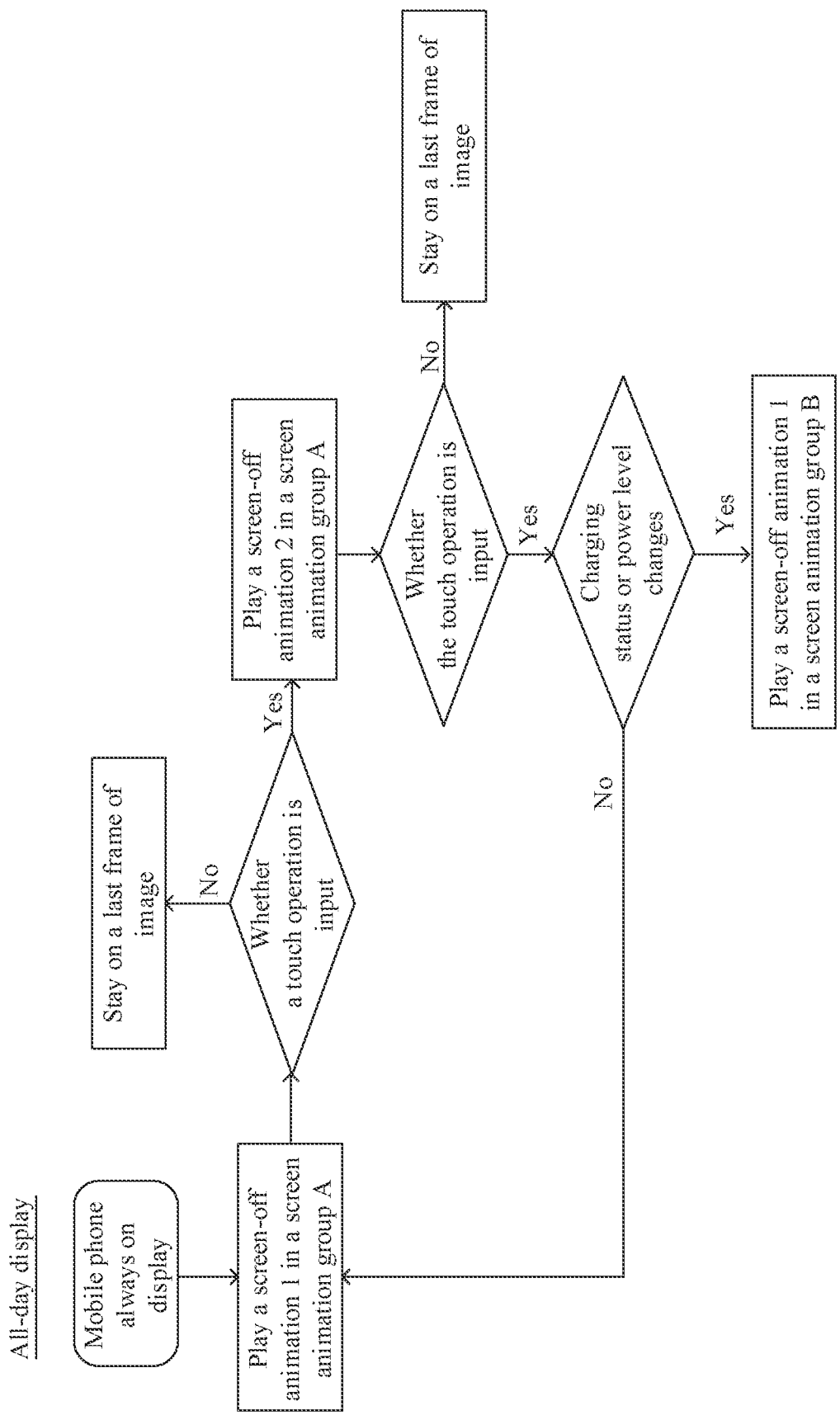
FIG. 11 is schematic flowchart 4 of an always on display method according to an embodiment of this application.

For example, when the display mode of the always on display function is all-day display, as shown in FIG. 11, after entering the screen-off state, the mobile phone may play the first screen-off animation in a corresponding screen-off animation group (for example, the screen-off animation group A) based on a current charging status and power information, that is, the screen-off animation 1. After playing of the screen-off animation 1 is completed, the mobile phone may freeze and display the last frame of image of the screen-off animation 1. That the mobile phone may freeze and display the last frame of image of the screen-off animation 1 means that the last frame of image of the screen-off animation 1 is continuously displayed. For example, the screen-off animation 1 is displayed in a display area 1 on the display. After playing of the screen-off animation 1 is completed, the mobile phone may refresh display content on the display at a specific frame rate, and display content in the display area 1 is the last frame of image of the screen-off animation 1 at each refresh. Subsequently, the mobile phone may monitor whether the user inputs a touch operation. If no touch operation input by the user is detected, the mobile phone may stay on the last frame of image of the screen-off animation 1 (that is, the last frame of image).

If a touch operation input by the user is detected, still as shown in FIG. 11, the mobile phone may play the second screen-off animation in the screen-off animation group A, that is, the screen-off animation 2. After playing of the screen-off animation 2 is completed, the mobile phone may freeze and display the last frame of image of the screen-off animation 2. For example, the screen-off animation group A includes only the screen-off animation 1 and the screen-off animation 2. Before playing of the screen-off animation 2 is completed, even if the mobile phone detects that the charging status of the mobile phone changes, or a level (that is, a power level) corresponding to the power information of the mobile phone changes, the mobile phone can still play the screen-off animation 2 or stay on the last frame of image of the screen-off animation 1, instead of playing a screen-off animation group corresponding to a new power level (or a charging status), so as to avoid a phenomenon that the image cannot be effectively connected after jumping to a new screen-off animation group.

After the mobile phone freezes and displays the last frame of image of the screen-off animation 2, still as shown in FIG. 11, if no touch operation input by the user is detected, the mobile phone may stay on the last frame of image of the screen-off animation 2. Correspondingly, if the touch operation input by the user is detected, the mobile phone can obtain a latest charging status and power information, and then determine whether a current charging status or a current power level of the mobile phone changes. If neither the current charging status nor the current power level of the mobile phone changes, the mobile phone may replay the screen-off animation 1 in the screen-off animation group A. Correspondingly, if the current charging status or the current power level of the mobile phone changes, the mobile phone may play the first screen-off animation in a corresponding screen-off animation group (for example, the screen-off animation group B).

For example, the first frame of image of the first screen-off animation in the screen-off animation group B may be the same as or similar to the last frame of image of the last screen-off animation in the screen-off animation group A. In this way, when the mobile phone is switched from the screen-off animation group A to the screen-off animation group B, the user can be provided with seamless visual experience.

Alternatively, when the first frame of image of the first screen-off animation in the screen-off animation group B is different from the last frame of image of the last screen-off animation in the screen-off animation group A, the mobile phone may play a corresponding transition screen-off animation before playing the screen-off animation group B, the first frame of image of the transition screen-off animation may be the same as or similar to the last frame of image of the last screen-off animation in the screen-off animation group A, and the last frame of image of the transition screen-off animation may be the same as or similar to the first frame of image of the first screen-off animation in the screen-off animation group B. In this way, a soft transition can be performed between the screen-off animation group A and the screen-off animation group B by using the transition screen-off animation, to prevent appearance of the screen-off animation 2 from being too abrupt, so as to improve the user's visual experience.

Figure 12:
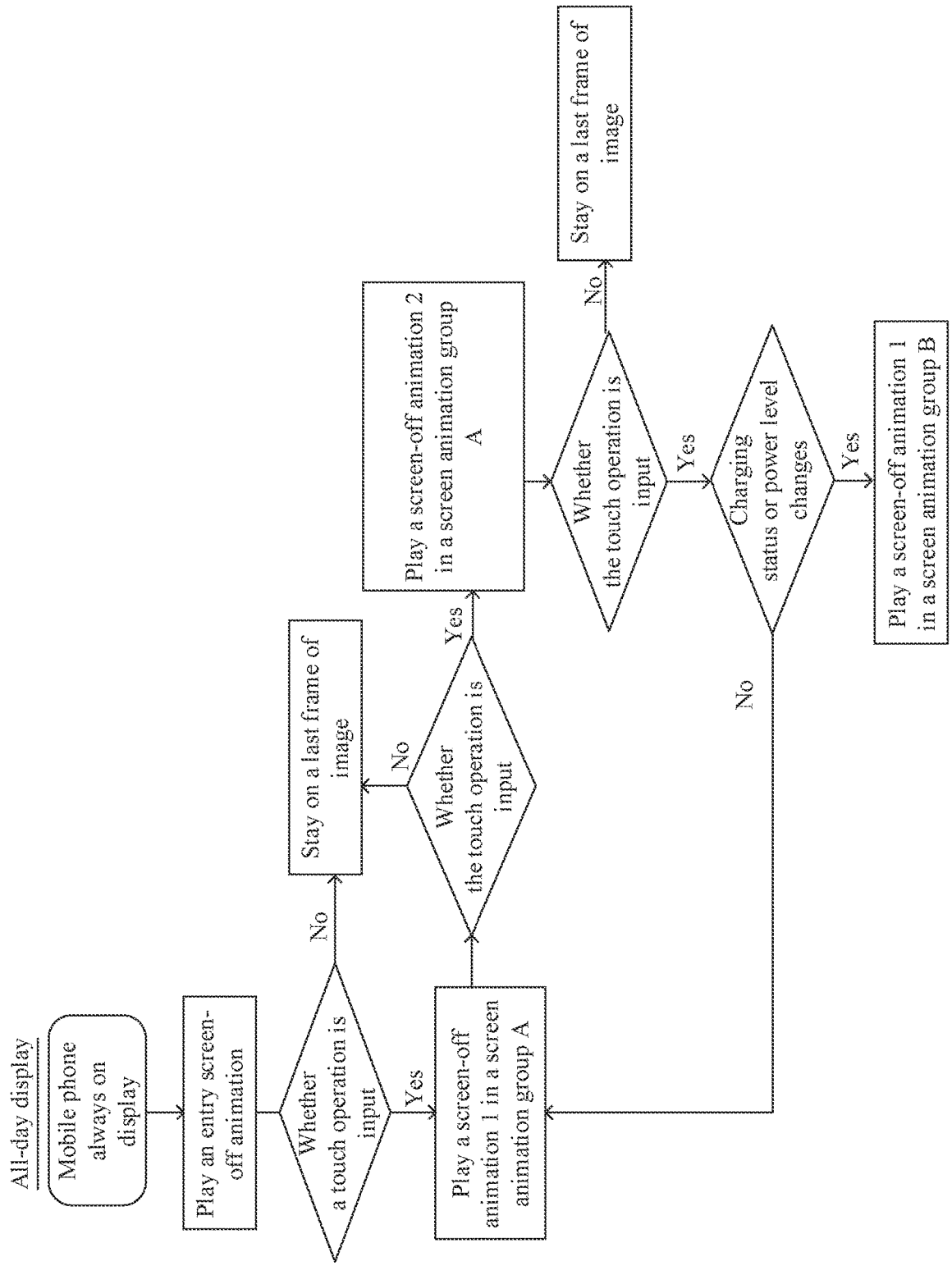
FIG. 12 is schematic flowchart 5 of an always on display method according to an embodiment of this application.
Figure 13:
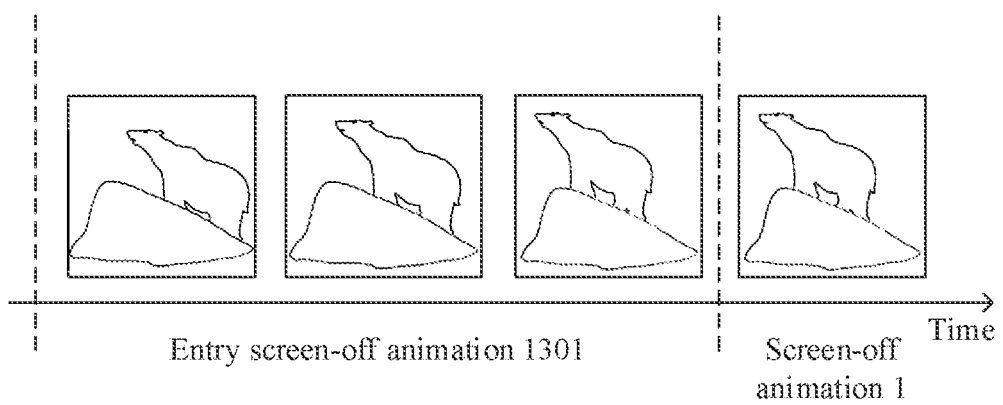
FIG. 13 is schematic diagram 6 of an application scenario of an always on display method according to an embodiment of this application.

That the display mode of the always on display function is all-day display is still used as an example. In some other embodiments, after the mobile phone enters the screen-off state, an entry screen-off animation may be displayed first, and then a screen-off animation group corresponding to a current charging status and current power information is displayed. As shown in FIG. 12, unlike an always on display process shown in FIG. 11, after entering the screen-off state, the mobile phone may first display an entry screen-off animation corresponding to the screen-off animation group A. An entry screen-off animation 1301 is used as an example, as shown in FIG. 13, the entry screen-off animation 1301 may be a process in which the polar bear walks onto the ice. The last frame of image of the entry screen-off animation 1301 may be the same as or similar to the first frame of image of the entry screen-off animation 1 in the entry screen-off animation group A that is to be displayed subsequently. Subsequently, still as shown in FIG. 12, if the mobile phone detects the touch operation input by the user, the mobile phone may display the first screen-off animation (that is, the screen-off animation 1) in the screen-off animation group A corresponding to a current charging status and current power information. A subsequent process in which the mobile phone performs the always on display is similar to an always on display process without the entry screen-off animation in FIG. 11. Therefore, details are not described herein again.

Figure 14:
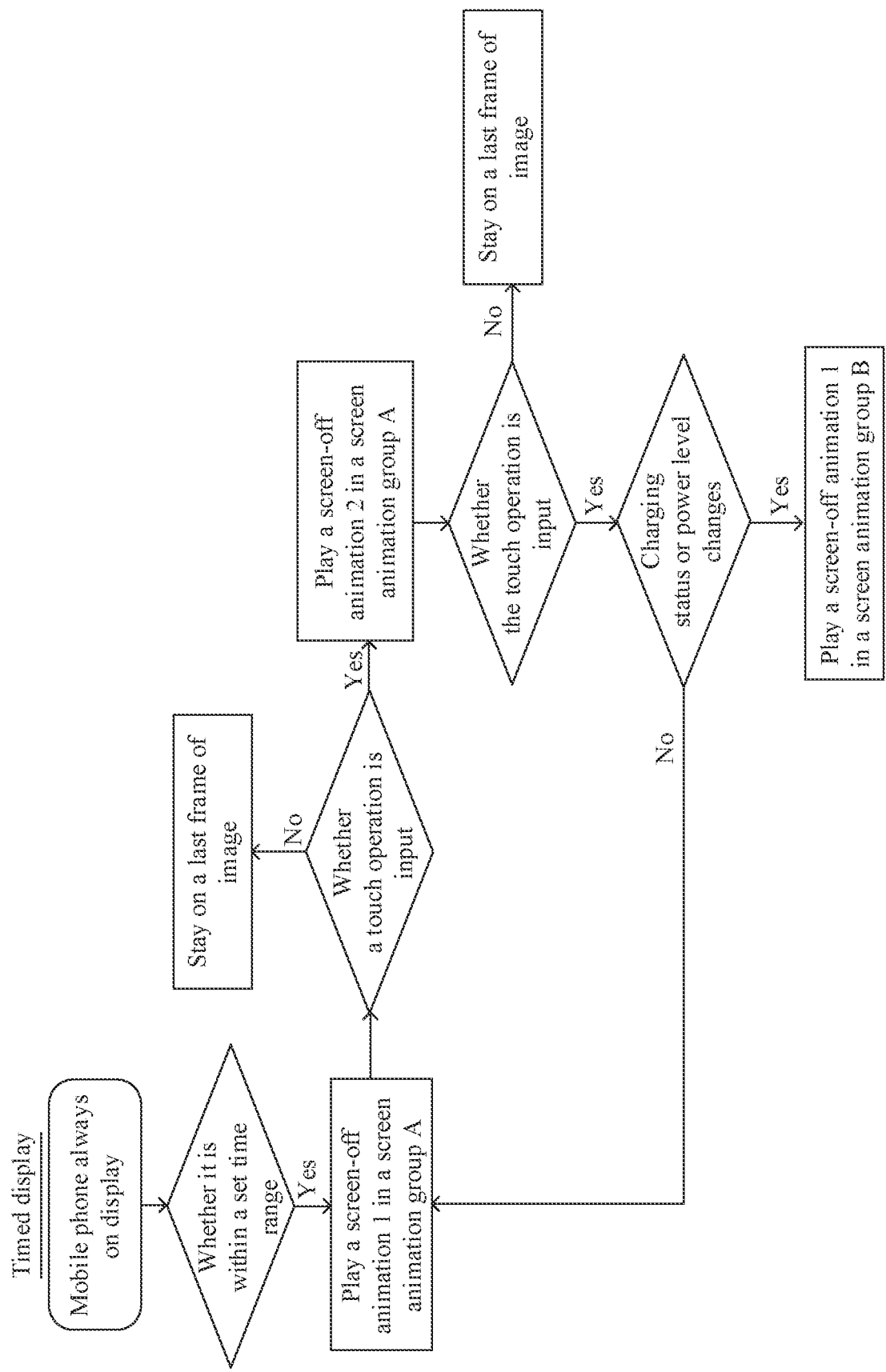
FIG. 14 is schematic flowchart 6 of an always on display method according to an embodiment of this application.
Figure 15:
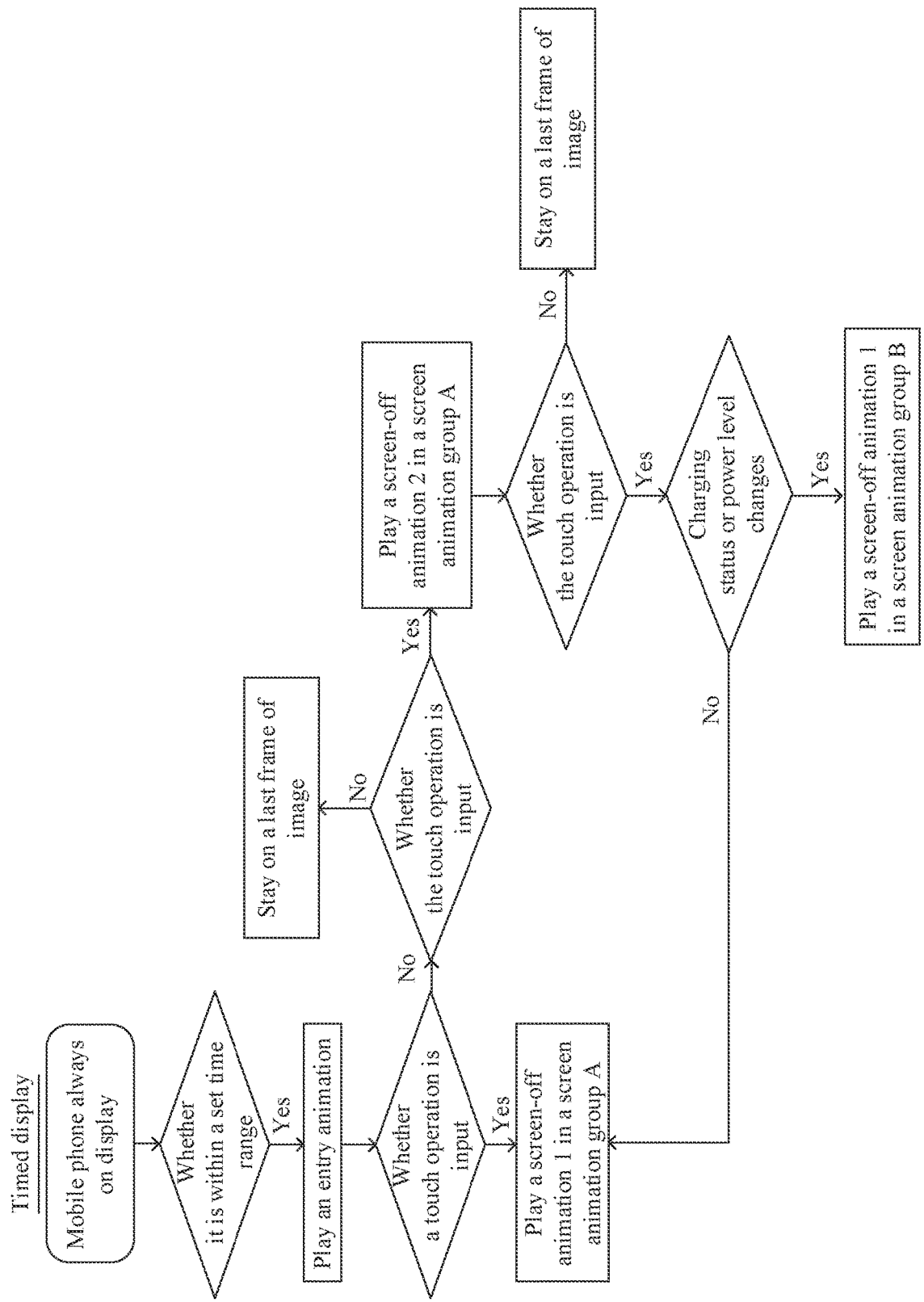
FIG. 15 is schematic flowchart 7 of an always on display method according to an embodiment of this application.

In some other embodiments, when the display mode of the always on display function is timed display, a method in which the mobile phone displays the screen-off animation group after the screen is off is similar to the foregoing method. A difference lies in that, as shown in FIG. 14, when entering the screen-off state, the mobile phone may determine whether a current time is within the time range set by the user. If the current time is within the time range set by the user, the mobile phone may perform always on display according to a related method shown in FIG. 11. Alternatively, as shown in FIG. 15, when entering the screen-off state, the mobile phone may determine whether a current time is within the time range set by the user. If the current time is within the time range set by the user, the mobile phone may display a corresponding screen-off animation according to the method shown in FIG. 12, and then display a screen-off animation group corresponding to a current charging status and current power information. Correspondingly, if the current time is not within the time range set by the user, after the screen is off, the mobile phone may enter the screen sleep state in a conventional manner.

Figure 16:
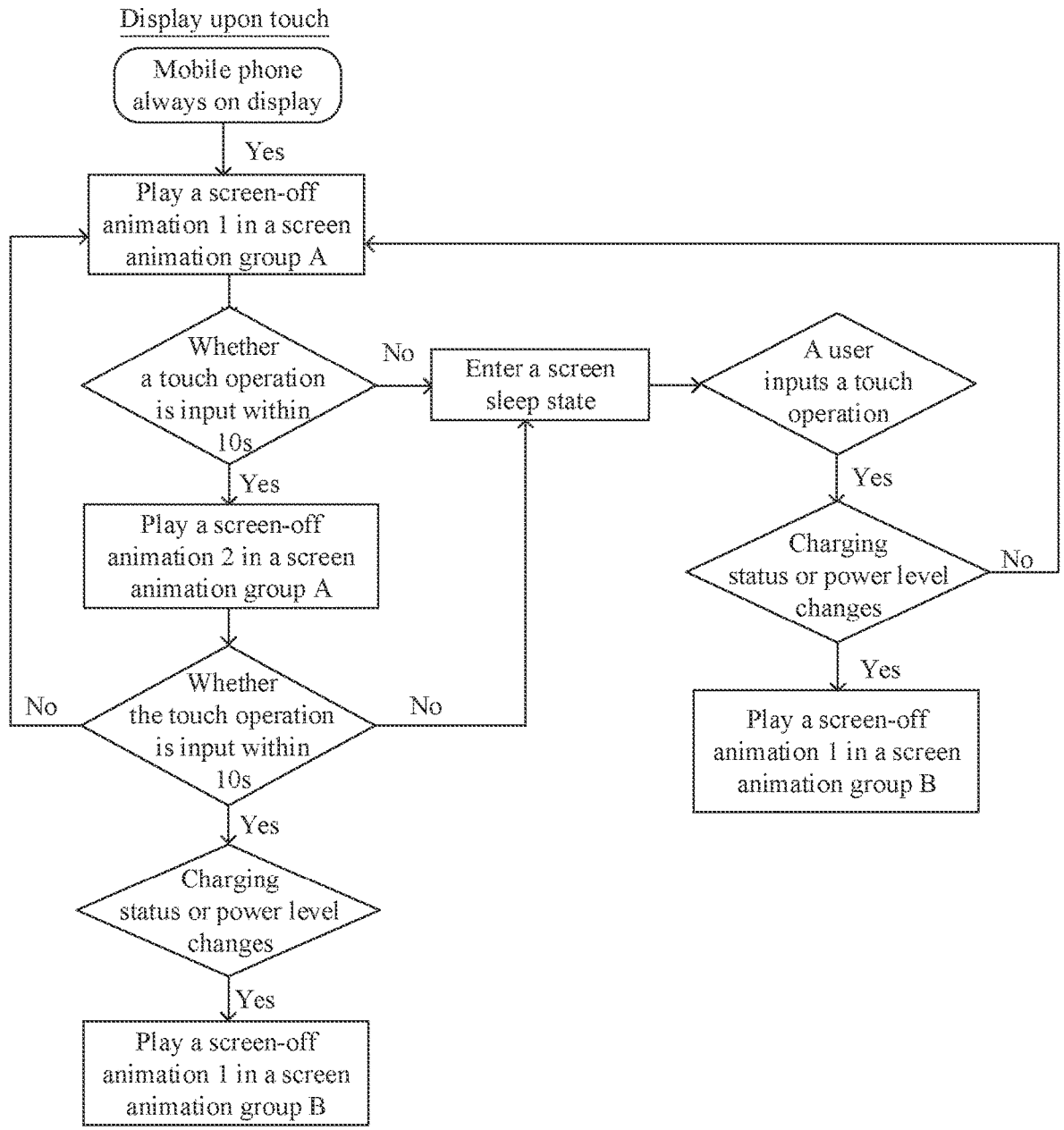
FIG. 16 is schematic flowchart 8 of an always on display method according to an embodiment of this application.

In some other embodiments, when the display mode of the always on display function is display upon touch, as shown in FIG. 16, after entering the screen-off state, the mobile phone may display the screen-off animation 1 in the screen-off animation group A based on a current charging status and current power information. After playing of the screen-off animation 1 is completed, the mobile phone may freeze and display the last frame of image of the screen-off animation 1. Further, the mobile phone may detect whether the touch operation input by the user is received within preset duration (for example, 10 s).

Still as shown in FIG. 16, if the touch operation input by the user is detected within the preset duration, the mobile phone may play the screen-off animation 2 in the screen-off animation group A. After playing of the screen-off animation 2 is completed, the mobile phone may freeze and display the last frame of image of the screen-off animation 2. Similarly, after playing of the screen-off animation 2 is completed, the mobile phone may detect whether the touch operation input by the user is detected within the preset duration (for example, 10 s). If no touch operation input by the user is detected, after the screen is off, the mobile phone may enter the screen sleep state in the conventional manner. If the touch operation input by the user is detected, the mobile phone can obtain a latest charging status and power information, and then determine whether a current charging status or a current power level of the mobile phone changes. If neither the current charging status nor the current power level of the mobile phone changes, the mobile phone may replay the screen-off animation 1 in the screen-off animation group A. Correspondingly, if the current charging status or the current power level of the mobile phone changes, the mobile phone may play the first screen-off animation in a corresponding screen-off animation group (for example, the screen-off animation group B).

After playing of the screen-off animation 1 is completed, if no touch operation input by the user is detected within the preset duration, as shown in FIG. 16, after the screen is off, the mobile phone may enter the screen sleep state in the conventional manner. Subsequently, if the mobile phone detects the touch operation input by the user in the screen sleep state, similar to the foregoing method, the mobile phone can obtain a latest charging status and power information, and then determine whether a current charging status or a current power level of the mobile phone changes. If neither the current charging status nor the current power level of the mobile phone changes, the mobile phone may replay the screen-off animation 1 in the screen-off animation group A. Correspondingly, if the current charging status or the current power level of the mobile phone changes, the mobile phone may play the first screen-off animation in a corresponding screen-off animation group (for example, the screen-off animation group B).

Figure 17:
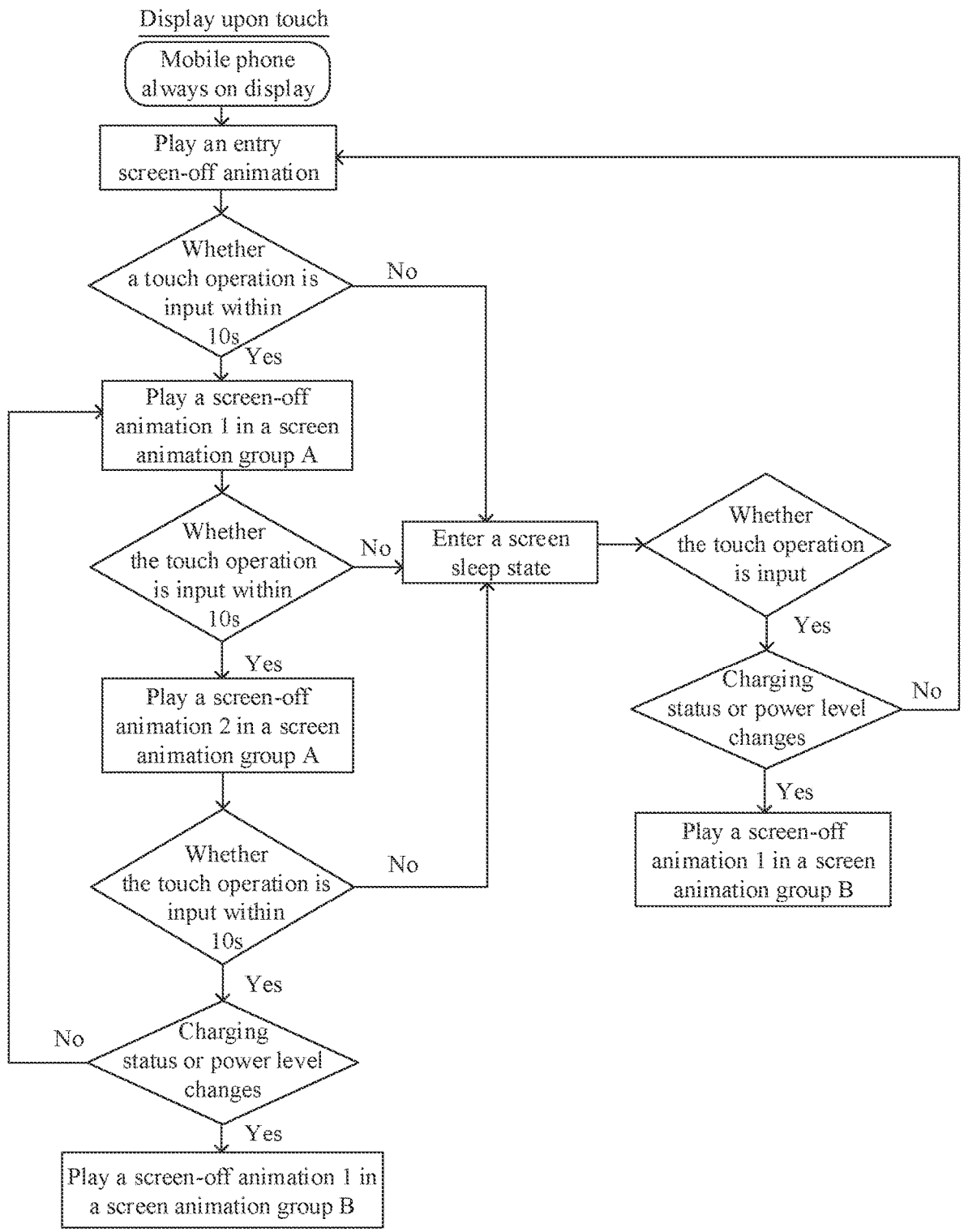
FIG. 17 is schematic flowchart 9 of an always on display method according to an embodiment of this application.

That the display mode of the always on display function is display upon touch is still used as an example. In some other embodiments, after the mobile phone enters the screen-off state, the entry screen-off animation may be displayed first, and then a screen-off animation group corresponding to a current charging status and current power information is displayed. As shown in FIG. 17, after entering the screen-off state, the mobile phone may first display the entry screen-off animation corresponding to the screen-off animation group A, for example, display the entry screen-off animation 1301 shown in FIG. 13. Further, after playing of the entry screen-off animation is completed, the mobile phone may stay on the last frame of image of the entry screen-off animation. Further, the mobile phone may detect whether the touch operation input by the user is received within the preset duration.

If the touch operation input by the user is detected within the preset duration after the entry screen-off animation is completed, still as shown in FIG. 17, the mobile phone may play the screen-off animation 1 in the screen-off animation group A corresponding to the current charging status and the current power information, and freeze the last frame of image of the screen-off animation 1 on the screen. Similarly, after playing of the screen-off animation 1 is completed, if the touch operation input by the user is detected within the preset duration, the mobile phone may play the screen-off animation 2 in the screen-off animation group A. After playing of the screen-off animation 2 is completed, the mobile phone may freeze and display the last frame of image of the screen-off animation 2. Similarly, after playing of the screen-off animation 2 is completed, the mobile phone may detect whether the touch operation input by the user is detected within the preset duration. If no touch operation input by the user is detected, after the screen is off, the mobile phone may enter the screen sleep state in the conventional manner. If the touch operation input by the user is detected, the mobile phone can obtain a latest charging status and power information, and then determine whether a current charging status or a current power level of the mobile phone changes. If neither the current charging status nor the current power level of the mobile phone changes, the mobile phone may replay the screen-off animation 1 in the screen-off animation group A. Correspondingly, if the current charging status or the current power level of the mobile phone changes, the mobile phone may play the first screen-off animation in a corresponding screen-off animation group (for example, the screen-off animation group B).

Correspondingly, still as shown in FIG. 17, if no touch operation input by the user is detected within the preset duration after playing of the entry screen-off animation is completed, the mobile phone may enter the screen sleep state. Alternatively, after playing of the screen-off animation 1 is completed, if no touch operation input by the user is detected within the preset duration, the mobile phone may enter the screen sleep state.

In the display mode of display upon touch, after the mobile phone enters the screen sleep state, as shown in FIG. 17, if the touch operation input by the user is detected, the mobile phone can obtain the latest charging status and power information, and then play the corresponding entry screen-off animation based on the current charging status or the current power level of the mobile phone. For example, if neither the current charging status nor the current power level of the mobile phone changes, the mobile phone may replay the entry screen-off animation corresponding to the screen-off animation group A (for example, the entry screen-off animation 1). Correspondingly, if the current charging status or the current power level of the mobile phone changes, for example, if the current charging status or the current power level of the mobile phone corresponds to the screen-off animation group B, the mobile phone may play the screen-off animation (for example, the screen-off animation 2) corresponding to the screen-off animation group B.

It may be learned that, regardless of whether the display mode of the screen display function is all-day display, timed display, or touch display, the mobile phone can select, based on a latest charging status and power information, a corresponding screen-off animation group for display in the screen-off state. In this way, the plurality of screen-off animations in the screen-off animation group can more intuitively and vividly transmit the latest charging status and power information to the user, to make always on display more real-time and interesting.

It should be noted that, in the foregoing embodiment, the screen-off animation group includes two screen-off animations is used as an example. It may be understood that if another screen-off animation (for example, the screen-off animation 3) is included in the screen-off animation group, the mobile phone may also perform always on display according to the foregoing method.

In addition, the touch operation in the foregoing embodiment may be a tapping operation or a double-tapping operation, or may be an operation such as a knuckle tapping or a stylus tapping. This is not limited in this embodiment of this application.

In some other embodiments, after the mobile phone enters the screen-off state, the mobile phone may not only respond to the touch operation input by the user, but also capture a facial image or an eye image of the user. For example, after the mobile phone enters the screen-off state, the mobile phone can invoke the camera to start capturing an image. When a facial image or an eye image of the user is captured, it indicates that user's attention is probably being focused on the screen of the mobile phone. In this case, the mobile phone may play a corresponding interactive screen-off animation. A person or an animal in the interactive screen-off animation may present a status of interacting with the user in front of the screen.

Figure 18:
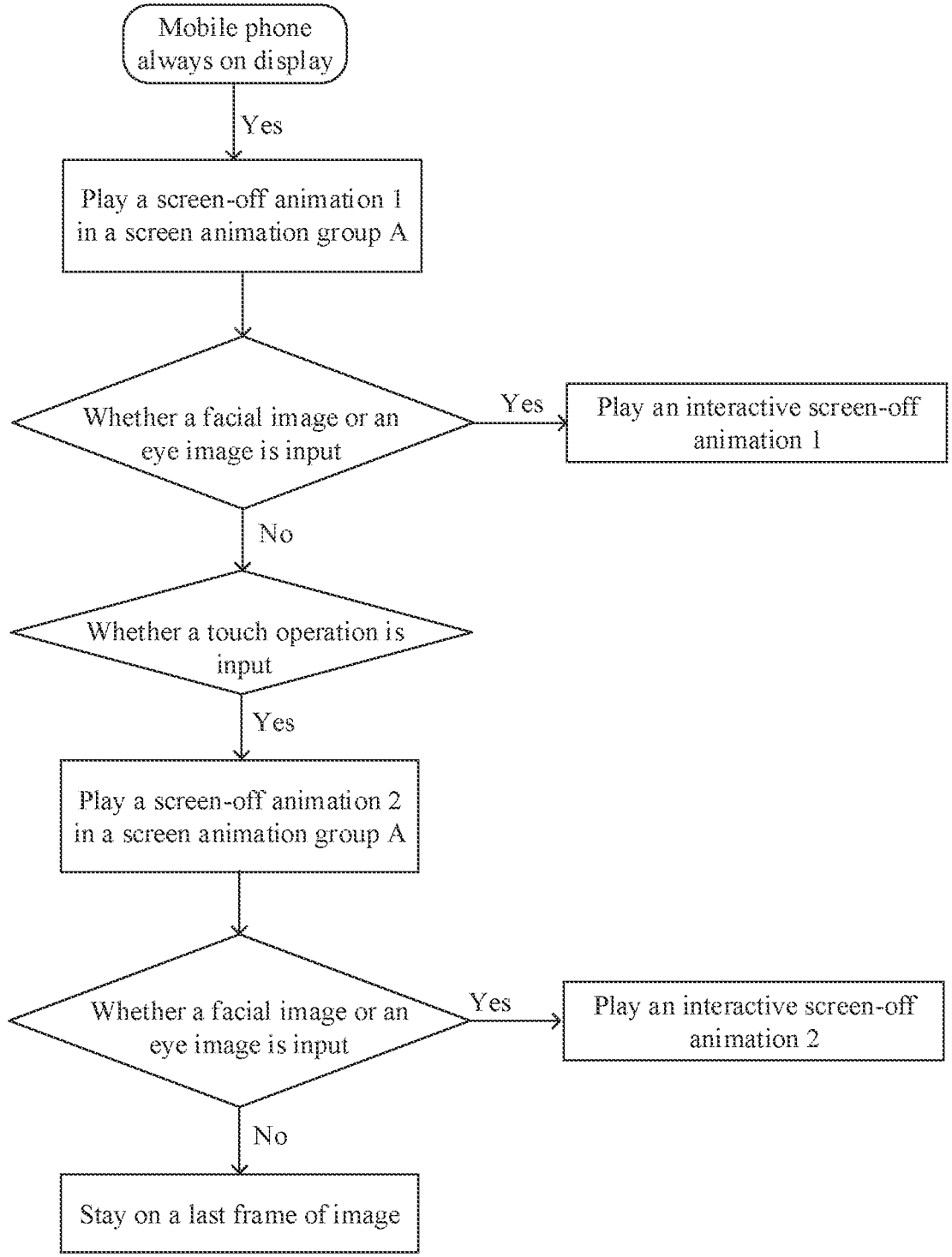
FIG. 18 is schematic flowchart 10 of an always on display method according to an embodiment of this application.

For example, as shown in FIG. 18, the mobile phone may play the screen-off animation 1 in the screen-off animation group A after entering the screen-off state, and then freeze and display the last frame of image of the screen-off animation 1. Subsequently, if a facial image or an eye image of the user is captured, the mobile phone may play an interactive screen-off animation 1 corresponding to the screen-off animation 1. The first frame of image of the interactive screen-off animation 1 may be the same or approximately the same as the last frame of image of the screen-off animation 1, and the last frame of image of the interactive screen-off animation 1 may be the same or approximately the same as the last frame of image of the screen-off animation 1.

Figure 19:
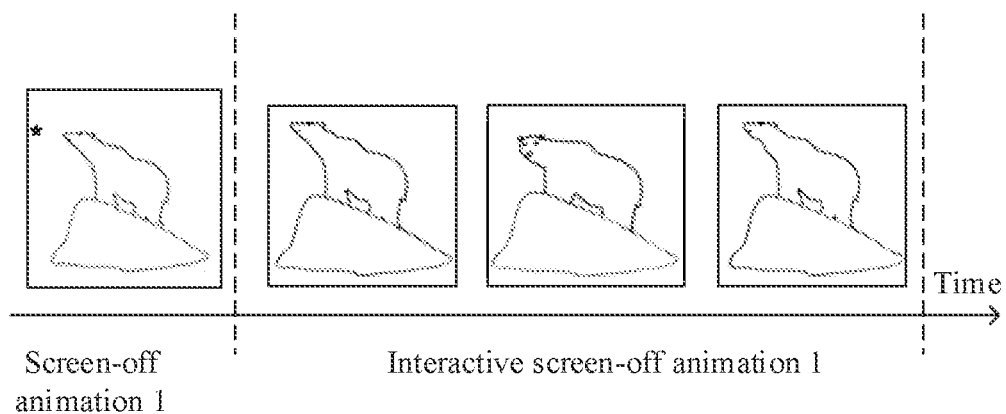
FIG. 19 is schematic diagram 7 of an application scenario of an always on display method according to an embodiment of this application.

For example, as shown in FIG. 19, the interactive screen-off animation 1 may be a polar bear turning its head to look at the user and then turning back to stand on the ice. In this way, by capturing the facial image or eye image of the user, the mobile phone is triggered to play the interactive screen-off animation 1 when the screen is off, thereby enhancing interaction and interest between the user and the mobile phone.

Still as shown in FIG. 18, after the mobile phone freezes and displays the last frame of image of the screen-off animation 1, if the touch operation input by the user is detected, the mobile phone may play the screen-off animation 2 in the screen-off animation group A according to the method described in the embodiment, and then freeze and display the last frame of image of the screen-off animation 2. Subsequently, similar to the foregoing embodiment, if a facial image or an eye image of the user is captured, the mobile phone may play an interactive screen-off animation 2 corresponding to the screen-off animation 2. The first frame of image of the interactive screen-off animation 2 may be the same or approximately the same as the last frame of image of the screen-off animation 2, and the last frame of image of the interactive screen-off animation 2 may be the same or approximately the same as the last frame of image of the screen-off animation 2.

That is, the mobile phone may set a corresponding interactive screen-off animation for each screen-off animation in the screen-off animation group, and after playing any screen-off animation in the screen-off animation group, the mobile phone may play the corresponding interactive screen-off animation in response to a facial image or an eye image input by the user, thereby enhancing interaction and interest between the user and the mobile phone.

In some embodiments, after playing the corresponding interactive screen-off animation (for example, the interactive screen-off animation 1 or the interactive screen-off animation 2) each time, the mobile phone may freeze and display the last frame of image of the interactive screen-off animation. If the mobile phone detects the facial image or eye image of the user again during playing of the interactive screen-off animation or when playing of the interactive screen-off animation is completed, the mobile phone may play the interactive screen-off animation again. Alternatively, the mobile phone may not respond to the facial image or eye image input by the user and not play the interactive screen-off animation again, so as to reduce power consumption of the mobile phone. Subsequently, when the mobile phone detects the facial image or eye image input by the user again, the mobile phone may play the interactive screen-off animation again.

Alternatively, after playing of the interactive screen-off animation is completed, the mobile phone may start a timer of specific duration (for example, 5 minutes). If the mobile phone detects the facial image or eye image input by the user before the timer expires, the mobile phone does not need to play the interactive screen-off animation again. Correspondingly, after the timer expires, if the mobile phone detects the facial image or eye image input by the user, the mobile phone may play the interactive screen-off animation again.

Alternatively, the mobile phone may further dynamically play a corresponding interactive screen-off animation based on duration of the facial image or eye image input by the user. For example, when detecting the facial image or eye image input by the user, the mobile phone may play a process in which the polar bear turns its head to look at the user in the corresponding interactive screen-off animation 1; when the user continues to input the facial image or eye image, the mobile phone may display a process in which the polar bear looks at the user in the interactive screen-off animation 1; and when the mobile phone detects that the facial image or eye image of the user has gone, the mobile phone may display a process in which the polar bear turns back to stand on the ice in the interactive screen-off animation 1.

For example, if the mobile phone detects both the facial image (or the eye image) of the user and the touch operation input by the user when the mobile phone freezes and displays the last frame of image of a specific screen-off animation, the mobile phone may play the corresponding interactive screen-off animation in response to an event that the facial image (or the eye image) of the user is detected. In this case, the mobile phone does not need to respond to the touch operation input by the user. That is, the priority of the event that the facial image (or the eye image) of the user is detected may be higher than the priority of the event that the touch operation is detected. Certainly, the priority of the event that the touch operation is detected may be set to be higher than the priority of the event that the facial image (or the eye image) of the user is detected. This is not limited in this embodiment of this application.

In addition, if the mobile phone detects a touch operation input by the user or the facial image or the eye image of the user in the process of playing the screen-off animation (for example, the screen-off animation 1, the screen-off animation 2, or the interactive screen-off animation), the mobile phone may continue to play the screen-off animation being played without performing a response, to prevent interruption of the screen-off animation from affecting viewing experience of the user.

The forgoing embodiment is described by using an example in which the screen-off animation group includes two screen-off animations. It may be understood that any screen-off animation group may include three or more screen-off animations.

Figure 20:
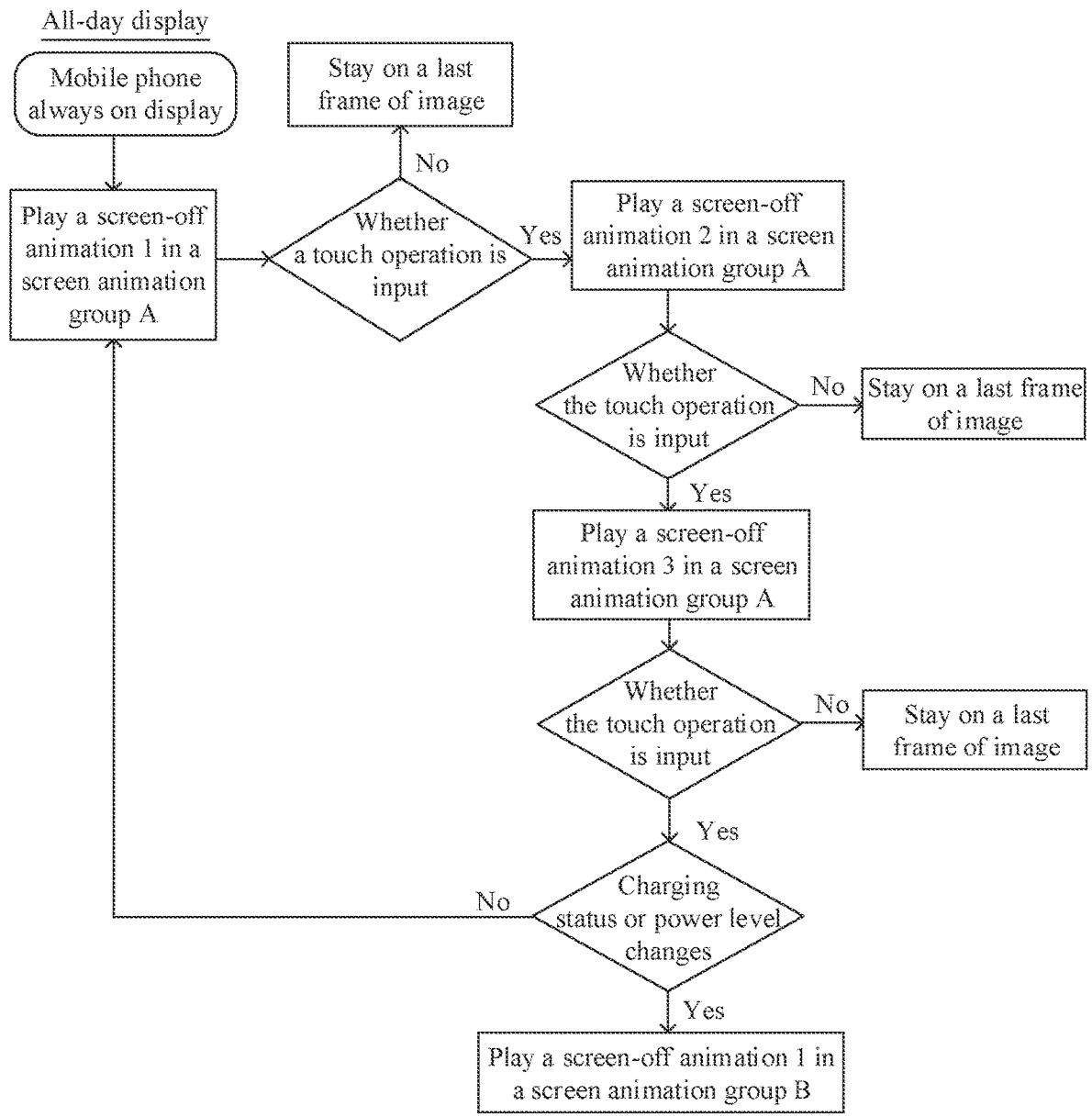
FIG. 20 is schematic flowchart 11 of an always on display method according to an embodiment of this application.

For example, the mode of always on display is all-day display. The screen-off animation group A may include the screen-off animation 1, the screen-off animation 2, and the screen-off animation 3. As shown in FIG. 20, after the screen is off, the mobile phone may play the screen-off animation 1 in the screen-off animation group A based on the current charging status and the current power information. After playing of the screen-off animation 1 is completed, the mobile phone may freeze and display the last frame of image of the screen-off animation 1. Further, if the touch operation input by the user is detected, the mobile phone may play the screen-off animation 2 in the screen-off animation group A, and then freeze and display the last frame of image of the screen-off animation 2. Further, if the touch operation input by the user is detected, the mobile phone may play the screen-off animation 3 in the screen-off animation group A, and then freeze and display the last frame of image of the screen-off animation 3.

Still as shown in FIG. 20, after the mobile phone freezes and displays the last frame of image of the screen-off animation 3, if the touch operation input by the user is detected, the mobile phone may obtain the latest charging status and power information of the mobile phone. If neither the current charging status nor the current power level of the mobile phone changes, the mobile phone may replay the screen-off animation 1 in the screen-off animation group A. Correspondingly, if the current charging status or the current power level of the mobile phone changes, the mobile phone may play the first screen-off animation in a corresponding screen-off animation group (for example, the screen-off animation 1 in the screen-off animation group B). That is, after all three screen-off animations in the screen-off animation group A are played, the mobile phone may display a screen-off animation in another screen-off animation group based on the latest charging status and power information.

Certainly, if the mode of always on display is timed display, or display upon touch, the mobile phone may also display the screen-off animation 1, the screen-off animation 2, and the screen-off animation 3 in the screen-off animation group A according to the method described above. This is not limited in this embodiment of this application.

In the foregoing embodiments, an example in which the charging status or power information of the mobile phone is used as the usage data of the mobile phone is used to illustrate how the mobile phone in the screen-off state displays a screen-off animation group associated with the usage data. In some other embodiments, the mobile phone may alternatively dynamically display different screen-off animation groups in the screen-off state based on another usage data (such as, a user step, whether music is being played, weather, or time).

For example, after the mobile phone detects the screen-off event, if the mobile phone is running a music APP, a screen-off animation group associated with a state of music being played may be displayed after the screen is off. Correspondingly, if the mobile phone is running no music APP, a screen-off animation group associated with a state of no music being played may be displayed after the screen is off. In this way, the user can vividly and visually know, through the plurality of screen-off animations in the screen-off animation group, a current state of whether the mobile phone is playing music.

For another example, the mobile phone may dynamically display different screen-off animation groups in the screen-off state in combination with various usage data of the mobile phone. For example, the mobile phone may display different screen-off animation groups by combining two types of usage data, namely the current power information and whether the music APP is running, so as to convey, to the user, a current usage status of the mobile phone, such as power of the mobile phone and whether music is being played.

In addition, when the mobile phone displays the screen-off animation or the screen-off animation group in the screen-off state, a display location of the screen-off animation or the screen-off animation group may be moved. For example, the mobile phone may periodically move the display location of the screen-off animation or the screen-off animation group based on a preset motion track at a period of 3 s, to avoid a burn-in phenomenon caused by displaying the same or similar content at a specific location for a long time.

It should be noted that, although the foregoing embodiments are described by using an example in which a mobile phone performs always on display, it can be understood that the foregoing always on display method may also be applied to electronic devices such as a vehicle-mounted device, a tablet computer, and a watch, and all these devices can be used to implement the always on display method in the foregoing embodiments. This is not limited in this embodiment of this application.

Figure 21:
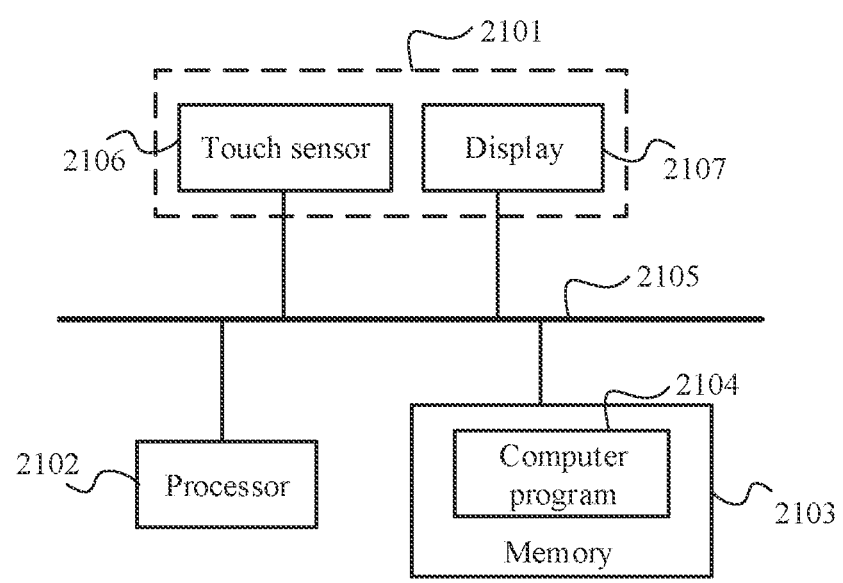
FIG. 21 is schematic diagram 2 of a structure of an electronic device according to an embodiment of this application.

As shown in FIG. 21, an embodiment of this application discloses an electronic device, and the electronic device may be the foregoing mobile phone. The electronic device may specifically include: a touchscreen 2101, where the touchscreen 2101 includes a touch sensor 2106 and a display 2107; one or more processors 2102; a memory 2103; one or more applications (not shown); and one or more computer programs 2104. These various components may be connected via one or more communication buses 2105. The one or more computer programs 2104 are stored in the memory 2103 and are used to be executed by the one or more processors 2102. The one or more computer programs 2104 include instructions, and the instructions may be used to perform steps in the foregoing embodiments.

According to the descriptions of the implementations, a person skilled in the art may clearly understand that, for the purpose of convenient and brief description, only division of the foregoing function modules is used as an example for description. In the practical application, the functions may be allocated to and completed by different function modules according to requirements. That is, an internal structure of the apparatus is divided into different function modules, to complete all or some of the functions described above. For a detailed working process of the foregoing system, apparatus, and unit, reference may be made to a corresponding process in the foregoing method embodiments, and details are not described herein again.

Function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application. However, the protection scope of embodiments of this application is not limited thereto. Any change or replacement within the technical scope disclosed in embodiments of this application shall fall within the protection scope of embodiments of this application. Therefore, the protection scope of embodiments of this application shall be subject to the protection scope of the claims.

What is claimed is:

1. A display method, the method comprising:
   receiving, by an electronic device, a screen-off event;
   in response to the screen-off event, entering, by the electronic device, a screen-off state;
   displaying, by the electronic device, a first screen-off animation in a first screen-off animation group based on a first charging status and first power information of the electronic device;
   after displaying, by the electronic device, the first screen-off animation in the first screen-off animation group, playing, by the electronic device based on the electronic device capturing a facial image or an eye image of a user, a first interactive screen-off animation, wherein a first frame of the first interactive screen-off animation is the same as a last frame of the first screen-off animation;
   after the first screen-off animation ends, detecting, by the electronic device, a first touch operation of the user;
   in response to the first touch operation, displaying, by the electronic device, a second screen-off animation in the first screen-off animation group, wherein the first screen-off animation group comprises the first screen-off animation and the second screen-off animation; and after the displaying, by the electronic device, the second screen-off animation in the first screen-off animation group, playing, by the electronic device based on the electronic device capturing the facial image or the eye image of the user, a second interactive screen-off animation, wherein a first frame of the second interactive screen-off animation is the same as a last frame of the second screen-off animation, wherein animation objects in the first interactive screen-off animation and the second interactive screen-off animation each present a status of interacting with the user.

2. The method according to claim 1,
wherein after the first screen-off animation ends, the method further comprises:
freezing and displaying, by the electronic device, the last frame of the first screen-off animation; and
wherein after the displaying, by the electronic device, the second screen-off animation in the first screen-off animation group, the method further comprises:
freezing and displaying, by the electronic device, the last frame of the second screen-off animation.

3. The method according to claim 2, wherein after the freezing and displaying, by the electronic device, the last frame of the second screen-off animation, the method further comprises:
detecting, by the electronic device, a second touch operation input by the user;
in response to the second touch operation, obtaining, by the electronic device, a second charging status and second power information of the electronic device;
based on the second charging status of the electronic device or the second power level of the electronic device changing relative to the first charging status or the first power level, respectively, playing, by the electronic device, a third screen-off animation in a corresponding second screen-off animation group; and
based on neither the second charging status of the electronic device nor the second power level of the electronic device changing relative to the first charging status and the first power level, respectively, playing, by the electronic device, the first screen-off animation.

4. The method according to claim 1, wherein the detecting, by the electronic device, the first touch operation input by the user comprises:
after the first screen-off animation ends, detecting, by the electronic device, the first touch operation input by the user within a preset duration.

5. The method according to claim 4, wherein after the displaying, by the electronic device, the second screen-off animation in the first screen-off animation group, the method further comprises:
based on detecting a third touch operation input by the user within the preset duration after the second screen-off animation ends, obtaining, by the electronic device, a third charging status and a third power information of the electronic device;
based on the third charging status of the electronic device or the third power level of the electronic device changing relative to the first charging status or the first power level, respectively, playing, by the electronic device, a third screen-off animation in a corresponding second screen-off animation group; and
based on neither the third charging status of the electronic device nor the third power level of the electronic device changing relative to the first charging status and the first power level, respectively, playing, by the electronic device, the first screen-off animation.

6. The method according to claim 5, wherein the method further comprises:
based on no first touch operation input by the user being detected within the preset duration after the first screen-off animation ends, entering, by the electronic device, a screen sleep state; or
based on no third touch operation input by the user being detected within the preset duration after the second screen-off animation ends, entering, by the electronic device, the screen sleep state.

7. The method according to claim 6, wherein after the entering, by the electronic device, the screen sleep state, the method further comprises:
based on detecting a fourth touch operation input by the user within the preset duration after entering the screen sleep state, obtaining, by the electronic device, a fourth charging status and a fourth power information of the electronic device;
based on the fourth charging status of the electronic device or the fourth power level of the electronic device changing relative to the first charging status or the first power level, respectively, playing, by the electronic device, a third screen-off animation in a corresponding second screen-off animation group; and
based on neither the fourth charging status of the electronic device nor the fourth power level of the electronic device changing relative to the first charging status and the first power level, respectively, playing, by the electronic device, the first screen-off animation.

8. The method according to claim 1, wherein after the entering, by the electronic device, the screen-off state, before the displaying, by the electronic device, the first screen-off animation in the first screen-off animation group based on the first charging status and the first power information of the electronic device, the method further comprises:
displaying, by the electronic device, a entry screen-off animation, wherein a last frame of the entry screen-off animation is the same as a first frame of the first screen-off animation.

9. The method according to claim 1, wherein:
the last frame of the first screen-off animation is the same as a first frame of the second screen-off animation; or
an animation object in the first screen-off animation is the same as an animation object in the second screen-off animation; or
an event performed by an animation object in the first screen-off animation is the same as an event performed by an animation object in the second screen-off animation.

10. The method according to claim 1, wherein the first screen-off animation group further comprises the third screen-off animation, and after the displaying, by the electronic device, the second screen-off animation in the first screen-off animation group, the method further comprises:
after the second screen-off animation ends, detecting, by the electronic device, a fifth touch operation input by the user; and
in response to the fifth touch operation, displaying, by the electronic device, the third screen-off animation in the first screen-off animation group.

11. The method according to claim 1, wherein the electronic device skips responding to the touch operation input by the user while the first screen-off animation or the second screen-off animation is being played.

12. An electronic device, comprising:
a touch screen, wherein the touch screen comprises a touch sensor and a display;

one or more processors; and a memory storing one or more computer programs, the one or more computer programs comprising instructions, and when the instructions are executed by the one or more processors, the electronic device is enabled to perform a display method comprising:

receiving a screen-off event;

in response to the screen-off event, entering a screen-off state;

displaying, on the display, a first screen-off animation in a first screen-off animation group based on a first charging status and first power information of the electronic device;

after displaying the first screen-off animation in the first screen-off animation group, playing, based on the electronic device capturing a facial image or an eye image of a user, on the display a first interactive screen-off animation, wherein a first frame of the first interactive screen-off animation is the same as a last frame of the first screen-off animation;

after the first screen-off animation ends, detecting, by the touch sensor, a first touch operation of the user;

in response to the first touch operation, displaying, on the display, a second screen-off animation in the first screen-off animation group, wherein the first screen-off animation group comprises the first screen-off animation and the second screen-off animation; and after the displaying the second screen-off animation in the first screen-off animation group, playing, based on the electronic device capturing the facial image or the eye image of the user, on the display a second interactive screen-off animation, wherein a first frame of the second interactive screen-off animation is the same as a last frame of the second screen-off animation, wherein animation objects in the first interactive screen-off animation and the second interactive screen-off animation each present a status of interacting with the user.

13. A non-transitory computer-readable storage medium storing instructions that, when executed on an electronic device, cause the electronic device to perform a display method comprising:

receiving a screen-off event;

in response to the screen-off event, entering a screen-off state;

displaying, on the display, a first screen-off animation in a first screen-off animation group based on a first charging status and first power information of the electronic device;

after displaying the first screen-off animation in the first screen-off animation group, playing, based on the electronic device capturing a facial image or an eye image of a user, on the display a first interactive screen-off animation, wherein a first frame of the first interactive screen-off animation is the same as a last frame of the first screen-off animation;

after the first screen-off animation ends, detecting, by the touch sensor, a first touch operation of the user;

in response to the first touch operation, displaying, on the display, a second screen-off animation in the first screen-off animation group, wherein the first screen-off animation group comprises the first screen-off animation and the second screen-off animation; and after the displaying the second screen-off animation in the first screen-off animation group, playing, based on the electronic device capturing the facial image or the eye image of the user, on the display a second interactive screen-off animation, wherein a first frame of the second interactive screen-off animation is the same as a last frame of the second screen-off animation, wherein animation objects in the first interactive screen-off animation and the second interactive screen-off animation each present a status of interacting with the user.

14. The electronic device according to claim 12, wherein the detecting the first touch operation input by the user comprises:

after the first screen-off animation ends, detecting the first touch operation input by the user within a preset duration.

15. The electronic device according to claim 14, wherein after the displaying the second screen-off animation in the first screen-off animation group, the display method further comprises:

based on detecting a third touch operation input by the user within the preset duration after the second screen-off animation ends, obtaining a third charging status and a third power information of the electronic device;

based on the third charging status of the electronic device or the third power level of the electronic device changing relative to the first charging status or the first power level, respectively, playing a third screen-off animation in a corresponding second screen-off animation group; and based on neither the third charging status of the electronic device nor the third power level of the electronic device changing relative to the first charging status and the first power level, respectively, playing the first screen-off animation.

16. The electronic device according to claim 15, wherein the display method further comprises:

based on no first touch operation input by the user being detected within the preset duration after the first screen-off animation ends, entering a screen sleep state; or based on no third touch operation input by the user being detected within the preset duration after the second screen-off animation ends, entering the screen sleep state.

17. The computer-readable storage medium according to claim 13, wherein the detecting the first touch operation input by the user comprises:

after the first screen-off animation ends, detecting the first touch operation input by the user within a preset duration.

18. The computer-readable storage medium according to claim 17, wherein after the displaying the second screen-off animation in the first screen-off animation group, the display method further comprises:

based on detecting a third touch operation input by the user within the preset duration after the second screen-off animation ends, obtaining a third charging status and a third power information of the electronic device;

based on the third charging status of the electronic device or the third power level of the electronic device changing relative to the first charging status or the first power level, respectively, playing a third screen-off animation in a corresponding second screen-off animation group; and based on neither the third charging status of the electronic device nor the third power level of the electronic device changing relative to the first charging status and the first power level, respectively, playing the first screen-off animation.

19. The computer-readable storage medium according to claim 18, wherein the display method further comprises:
- based on no first touch operation input by the user being detected within the preset duration after the first screen-off animation ends, entering a screen sleep state; or
- based on no third touch operation input by the user being detected within the preset duration after the second screen-off animation ends, entering the screen sleep state.

* * * * *